United States Patent
Hanada et al.

(10) Patent No.: US 11,218,835 B2
(45) Date of Patent: Jan. 4, 2022

(54) INFORMATION PROCESSING APPARATUS, INFORMATION PROVIDING METHOD, AND INFORMATION PROVIDING SYSTEM

(71) Applicant: FUJITSU LIMITED, Kawasaki (JP)

(72) Inventors: Yuichi Hanada, Kawasaki (JP); Akira Fujii, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 42 days.

(21) Appl. No.: 16/736,950

(22) Filed: Jan. 8, 2020

(65) Prior Publication Data

US 2020/0145783 A1 May 7, 2020

Related U.S. Application Data

(63) Continuation of application No. PCT/JP2017/025818, filed on Jul. 14, 2017.

(51) Int. Cl.
| | |
|---|---|
| *H04W 4/021* | (2018.01) |
| *H04W 4/029* | (2018.01) |
| *G06F 16/29* | (2019.01) |
| *H04W 4/02* | (2018.01) |

(52) U.S. Cl.
CPC .......... *H04W 4/022* (2013.01); *G06F 16/29* (2019.01); *H04W 4/027* (2013.01); *H04W 4/029* (2018.02)

(58) Field of Classification Search
CPC ..... H04W 4/022; H04W 4/027; H04W 4/029; G06F 16/29
See application file for complete search history.

(56) References Cited

U.S. PATENT DOCUMENTS

| | | | |
|---|---|---|---|
| 9,894,478 B1* | 2/2018 | DeLuca | H04W 4/022 |
| 2013/0031047 A1 | 1/2013 | Boazi et al. | |
| 2013/0099977 A1 | 4/2013 | Sheshadri et al. | |
| 2014/0370911 A1 | 12/2014 | Gorgenyi et al. | |
| 2016/0212583 A9* | 7/2016 | Croy | H04W 4/021 |

(Continued)

FOREIGN PATENT DOCUMENTS

| | | |
|---|---|---|
| JP | 2014-527664 | 10/2014 |
| JP | 2015-503137 | 1/2015 |
| JP | 5737732 A | 5/2015 |

(Continued)

OTHER PUBLICATIONS

Japanese Office Action dated Nov. 24, 2020 for corresponding Japanese Patent Application No. 2019-529432 with English Translation, 11 pages.

(Continued)

*Primary Examiner* — Wayne H Cai
(74) *Attorney, Agent, or Firm* — Fujitsu Patent Center

(57) ABSTRACT

An Information processing apparatus, includes a memory; and a processor coupled to the memory and the processor configured to: store, for each of a plurality of areas represented by a geographical boundary line, information for specifying position of an area and a size of the area to the memory, acquire data regarding a position of a moving body, set a predetermined range on the basis of the acquired data, extract a target area from the plurality of areas on the basis of the predetermined range and the position of each of the plurality of areas, and control a size, stored in the memory, of the extracted target area.

15 Claims, 25 Drawing Sheets

(56) References Cited

U.S. PATENT DOCUMENTS

2018/0084381 A1* 3/2018 Ohbitsu ............. H04W 12/068
2018/0096392 A1* 4/2018 DeLuca ............. G06Q 30/0267

FOREIGN PATENT DOCUMENTS

| JP | 2016-521946 | 7/2016 |
| JP | 2016-181169 | 10/2016 |
| JP | 2017-111001 | 6/2017 |
| WO | 2015/179447 | 11/2015 |
| WO | 2016/194117 | 12/2016 |
| WO | 2016/194117 A1 | 12/2016 |

OTHER PUBLICATIONS

ISR—International Search Report (PCT Form PCT/ISA/210) and its English translation; Written Opinion (PCT Form PCT/ISA/237) and its partial English Translation issued for International Patent Application No. PCT/JP2017/025818. Both dated Sep. 26, 2017.

* cited by examiner

| GEOFENCE ID | LATITUDE | LONGITUDE | RADIUS [m] | SERVICE ID | CURRENT CHECK-IN COUNT | PAST CHECK-IN COUNT |
|---|---|---|---|---|---|---|
| G1 | 35.583890 | 139.640117 | 100 | S1,S2 | 100 | 80 |
| G2 | 35.582491 | 139.641998 | 150 | S2 | 20 | 400 |
| ... | ... | ... | ... | ... | ... | ... |
| Gm | 35.558194 | 139.712988 | 200 | S10,S11 | 50 | 150 |

FIG. 8

| POSITION INFORMATION | MOVING SPEED | MOVING AZIMUTH |
|---|---|---|
| (x, y, e) | v | θ |

USER SITUATION TABLE ~250

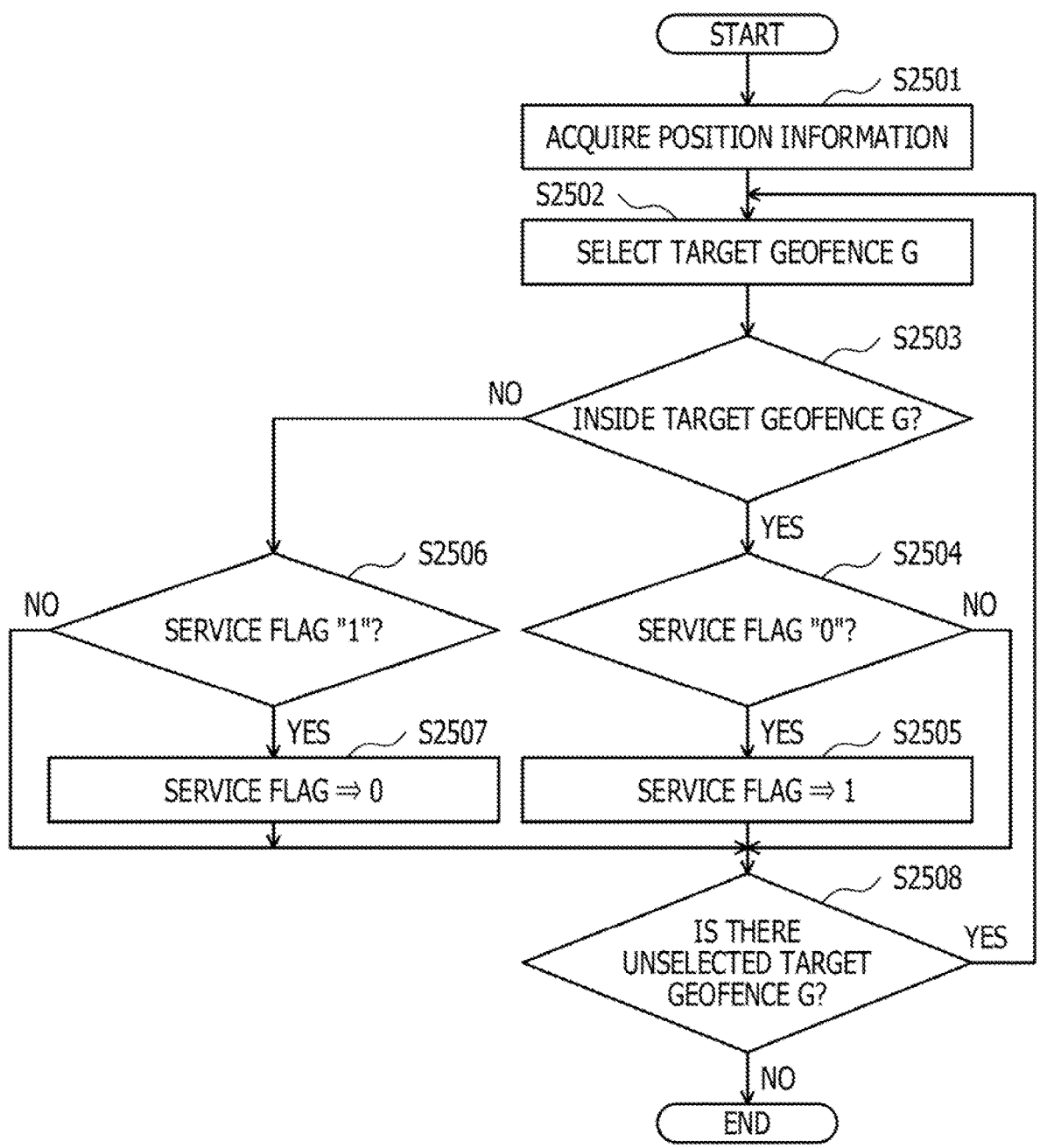

INFORMATION PROCESSING APPARATUS, INFORMATION PROVIDING METHOD, AND INFORMATION PROVIDING SYSTEM

CROSS-REFERENCE TO RELATED APPLICATION

This application is a continuation application of International Application PCT/JP2017/025818 filed on Jul. 14, 2017 and designated the U.S., the entire contents of which are incorporated herein by reference.

FIELD

The present invention relates to an Information processing apparatus, an information providing method, and an Information providing system.

BACKGROUND

In recent years, with the spread of smartphones, services using position information by a global positioning system (GPS), a wireless local area network (LAN), Bluetooth Low Energy (BLE), or the like are increasing. Bluetooth is a registered trademark. One of service providing methods using position information is called geofencing. Geofencing is a mechanism for providing a virtual fence (boundary line) on a map and providing a service when a user enters or leaves the fence.

In the prior art, there is a technique in which, when deviation of a user from a steady route having a related point of interest to a new route having a new related point of interest is detected, the original set of points of interests related to the steady route is updated with the new point of interest. Furthermore, there is a technique for providing a program with a geofence event selected from among geofence events at a time when the program is scheduled to be executed on a device during an execution period of an operating system. Furthermore, there is also a technique for temporarily modifying a geofence in response to an object entering or leaving an area bounded by a geofence.

Related art is disclosed in, for example, Japanese National Publication of International Patent Application No. 2014-527664, Japanese National Publication of International Patent Application No. 2016-521946, and Japanese National Publication of International Patent Application No. 2015-503137.

SUMMARY

According to an aspect of the embodiments, an Information processing apparatus, includes a memory; and a processor coupled to the memory and the processor configured to: store, for each of a plurality of areas represented by a geographical boundary line, information for specifying position of an area and a size of the area to the memory, acquire data regarding a position of a moving body, set a predetermined range on the basis of the acquired data, extract a target area from the plurality of areas on the basis of the predetermined range and the position of each of the plurality of areas, and control a size, stored in the memory, of the extracted target area.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is an explanatory diagram illustrating an example of stored content in a user situation table 250;

FIG. 25 is a flowchart illustrating an example of an information providing processing procedure of the terminal device Ti.

DESCRIPTION OF EMBODIMENTS

An effective position information service may not be able to be provided depending on moving speed, direction, or the like, of the user.

In one aspect, an object of the present invention is to enable provision of a more appropriate position information service.

Hereinafter, embodiments of an information processing apparatus, an Information providing method, and an Information providing system according to the present invention will be described in detail with reference to the drawings.

Embodiment

Figure 1:
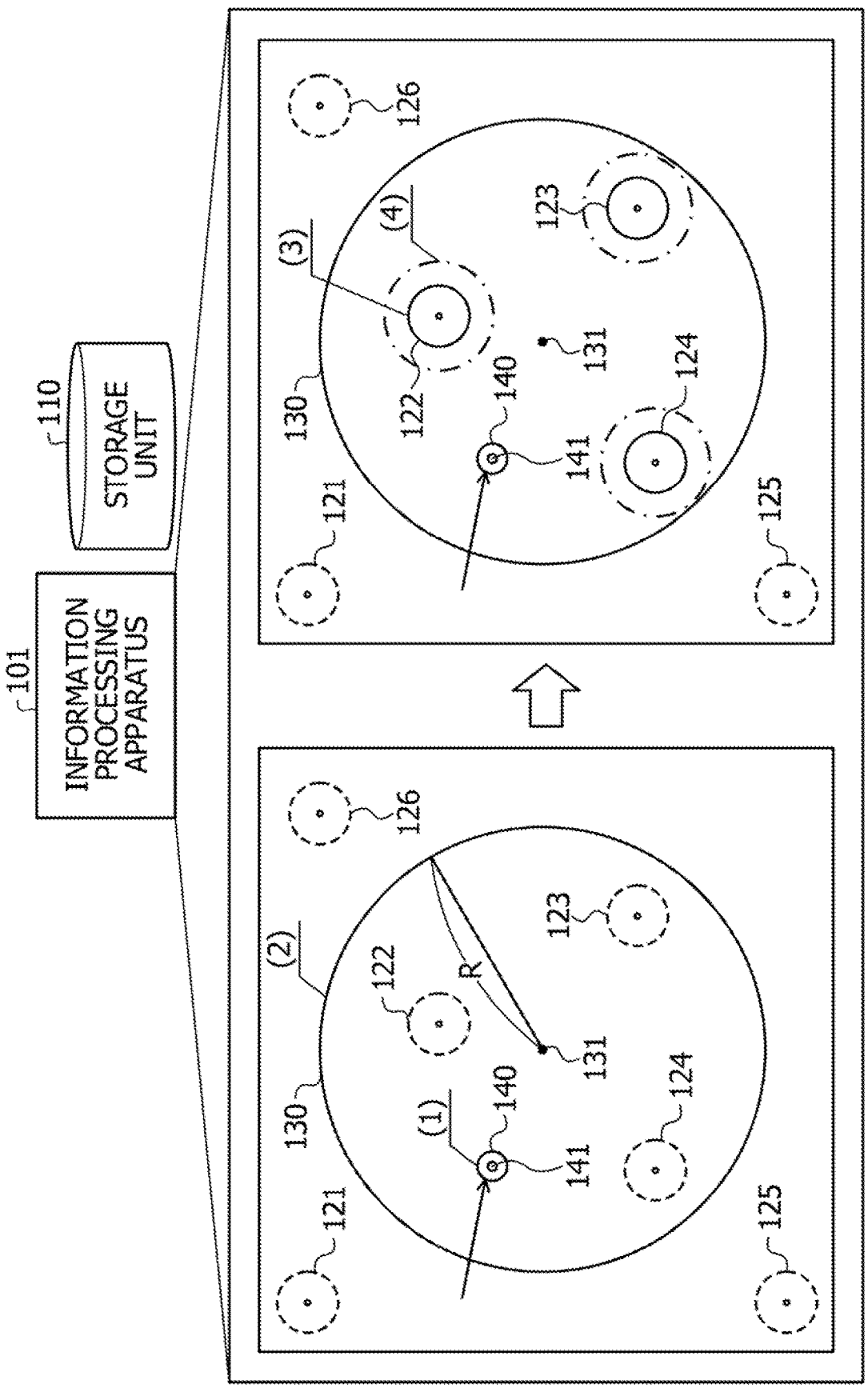
FIG. 1 is an explanatory diagram illustrating an example of an Information processing apparatus 101 according to an embodiment.

FIG. 1 is an explanatory diagram illustrating an example of an Information processing apparatus 101 according to an embodiment. In FIG. 1, the information processing apparatus 101 is a computer that has a storage unit 110 and controls a size of an area. The storage unit 110 stores information specifying a position and a size of each of a plurality of areas (for example, areas 121 to 126).

The area is an area represented by a geographical boundary line, a so-called geofence. The area is, for example, a circular area. The position of the area is, for example, coordinates (latitude and longitude) of a center of the area. The size of the area is, for example, a radius of the area. However, the shape of the area may be a shape other than a circle (for example, a rectangle).

Here, geofencing is one of position information service providing methods, and is a mechanism for providing a geofence on a map and providing a service when a user enters or leaves the geofence. According to the geofencing, in a case where a certain shop wants to increase the number of customers, for example, a service of distributing coupons encouraging users who have entered an area of a radius of 200 m centering on the shop to come to the shop can be provided.

However, there are some cases where an effective position information service cannot be provided depending on a situation of the user, such as a moving speed or a moving direction of the user, or an acquisition interval of position information. For example, the user may pass through the geofence before detecting entry of the user to the geofence depending on the moving speed of the user or the acquisition interval of the position information.

In this case, the entry of the user cannot be detected although the user has entered the geofence, and an opportunity to provide the service is missed. For this reason, expansion of the geofence is conceivable to reduce a probability of non-detection. However, blind expansion of the geofence may cause excessive notification to the user.

Therefore, in the present embodiment, an information providing method for enabling provision of a more appropriate position information service will be described. Hereinafter, a processing example of the information processing apparatus 101 will be described.

(1) The information processing apparatus 101 acquires data detected by a sensor 141 that measures information regarding the position of a moving body 140. The moving body 140 may be, for example, the user himself/herself or a vehicle such as an automobile, a motorcycle, or a bicycle. The sensor 141 is, for example, a global positioning system (GPS) unit, an acceleration sensor, a geomagnetic sensor, a gyro sensor, or the like.

Specifically, for example, the information processing apparatus 101 acquires position information of the moving body 140 and data detected by a predetermined sensor corresponding to the moving body 140. The position information of the moving body 140 is, for example, coordinates (latitude and longitude) representing the position of the moving body 140. The predetermined sensor is, for example, an acceleration sensor, a geomagnetic sensor, a gyro sensor, or the like.

Here, a case in which the information processing apparatus 101 is a computer carried by the user who is the moving body 140 or mounted on an automobile or motorcycle that is the moving body 140 is assumed. However, the information processing apparatus 101 may acquire the data of the sensor 141 from another computer carried by or mounted on the moving body 140.

(2) The Information processing apparatus 101 sets a predetermined range 130 on the basis of the acquired data. The predetermined range 130 is a range for searching for a target area. The target area is an area to be controlled in size. The shape of the predetermined range 130 can be arbitrarily set, and is, for example, a circular shape.

Specifically, for example, the information processing apparatus 101 sets the predetermined range 130 on the basis of the position of the moving body 140 at any point of time on or after a current point of time of the moving body 140, the position being predicted on the basis of the acquired data. More specifically, for example, the information processing apparatus 101 calculates a moving speed and a moving direction of the moving body 140 on the basis of the position information of the moving body 140 and the data of the predetermined sensor. Then, the information processing apparatus 101 sets the predetermined range 130 on the basis of the calculated moving speed and moving direction of the moving body 140.

Thereby, the predetermined range 130 can be set in consideration of the situation (the moving speed and the moving direction) of the moving body 140. In the example in FIG. 1, the predetermined range 130 having a radius R is set around a point 131 where the moving body 140 is predicted to move. The radius R can be arbitrarily set, and may be, for example, a fixed value or a value according to the moving speed of the moving body 140.

(3) The Information processing apparatus 101 extracts a target area from the plurality of areas on the basis of the predetermined range 130 and the positions of the areas stored in the storage unit 110. Specifically, for example, the information processing apparatus 101 refers to the storage unit 110 and extracts an area with the center included in the predetermined range 130 as the target area. In the example in FIG. 1, the areas 122 to 124 are extracted as the target areas within the predetermined range 130.

(4) The information processing apparatus 101 refers to the storage unit 110 and controls the size of the extracted target area. Specifically, for example, the information processing apparatus 101 may expand the size of the target area by multiplying the radius of the target area by a constant α ($\alpha>1$). The constant α can be arbitrarily set. Thereby, the sizes of the target areas can be uniformly expanded.

Furthermore, the information processing apparatus 101 may control the size of the target area according to the situation of the moving body 140 and the situation of the target area. For example, it can be said that a possibility of the moving body 140 reaching the target area is lower as the distance from the moving body 140 to the target area is longer. Therefore, for example, the information processing apparatus 101 may calculate the distance from the moving body 140 to each of the target areas, and make the radius of the target area larger as the distance to the target area is longer.

In the example in FIG. 1, each of the target areas 122 to 124 is expanded as illustrated by the dot-dash-line circles, as a result of the control to increase the radii of the target areas 122 to 124. The target areas 122 to 124 (dot-dash-line circles) are used for position information services by geofencing.

As described above, according to the information processing apparatus 101, the target areas can be extracted on the basis of the predetermined range 130 set according to the situation (for example, the moving speed and the moving direction) of the moving body 140, and the sizes of the target areas can be controlled. As a result, the areas 122 to 124 around the point having a high possibility that the moving body 140 will move to in the future can be narrowed as the target areas, and the sizes of the target areas can be controlled so as to avoid non-detection of the entry and leaving of the user.

In the example of FIG. 1, expansion of the sizes of the areas 122 to 124 around the point having a high possibility that the user will move to in the future prevents non-detection of entry although the user has entered the areas 122 to 124, and can provide a more appropriate position information service. In other words, expansion of areas (for example, the areas 121, 125, and 126) to which the user is less likely to move in the future can be prevented and excessive notification to the user can be prevented.

(System Configuration Example of information Providing System 200)

Next, a system configuration example of an information providing system 200 according to the embodiment will be described. Here, a case in which the information processing apparatus 101 illustrated in FIG. 1 is applied to terminal devices T1 to Tn (n: a natural number of 2 or larger) will be described as an example.

Figure 2:
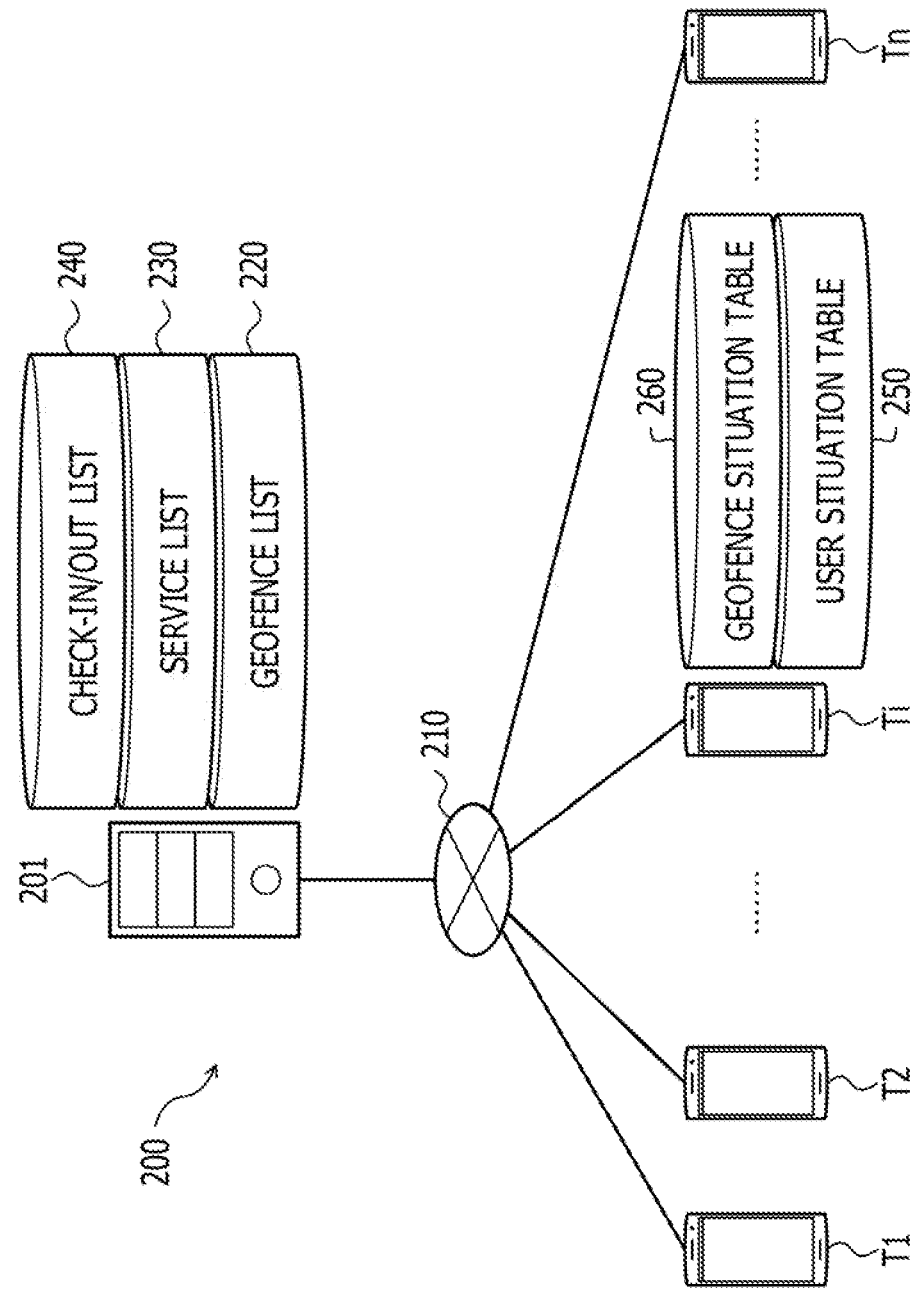
FIG. 2 is an explanatory diagram illustrating a system configuration example of an Information providing system 200.

FIG. 2 is an explanatory diagram illustrating a system configuration example of the information providing system 200. In FIG. 2, the information providing system 200 includes a server 201 and the terminal devices T1 to Tn. In the information providing system 200, the server 201 and the terminal devices T1 to Tn are connected via a wired or wireless network 210. The network 210 is, for example, a LAN, a wide area network (WAN), a mobile communication network, the Internet, or the like.

In the following description, an arbitrary terminal device among the terminal devices T1 to Tn may be described as "terminal device Ti" (I=1, 2, . . . , n).

Here, the server 201 is a computer that includes a geofence list 220, a service list 230, and a check-in/out list 240, and provides various types of information. Note that stored content in the various lists 220, 230, and 240 will be described below with reference to FIGS. 5 to 7.

The terminal device Ti is a computer including a user situation table 250 and a geofence situation table 260, and used by the user of the information providing system 200. The terminal device Ti is, for example, a smartphone, a tablet personal computer (PC), a mobile phone, a personal handy-phone system (PHS), or the like. Note that stored content in the various tables 250 and 260 will be described below with reference to FIGS. 8 and 9.

(Hardware Configuration Example of Terminal Device Ti)

Next, a hardware configuration example of the terminal device Ti illustrated in FIG. 2 will be described.

Figure 3:
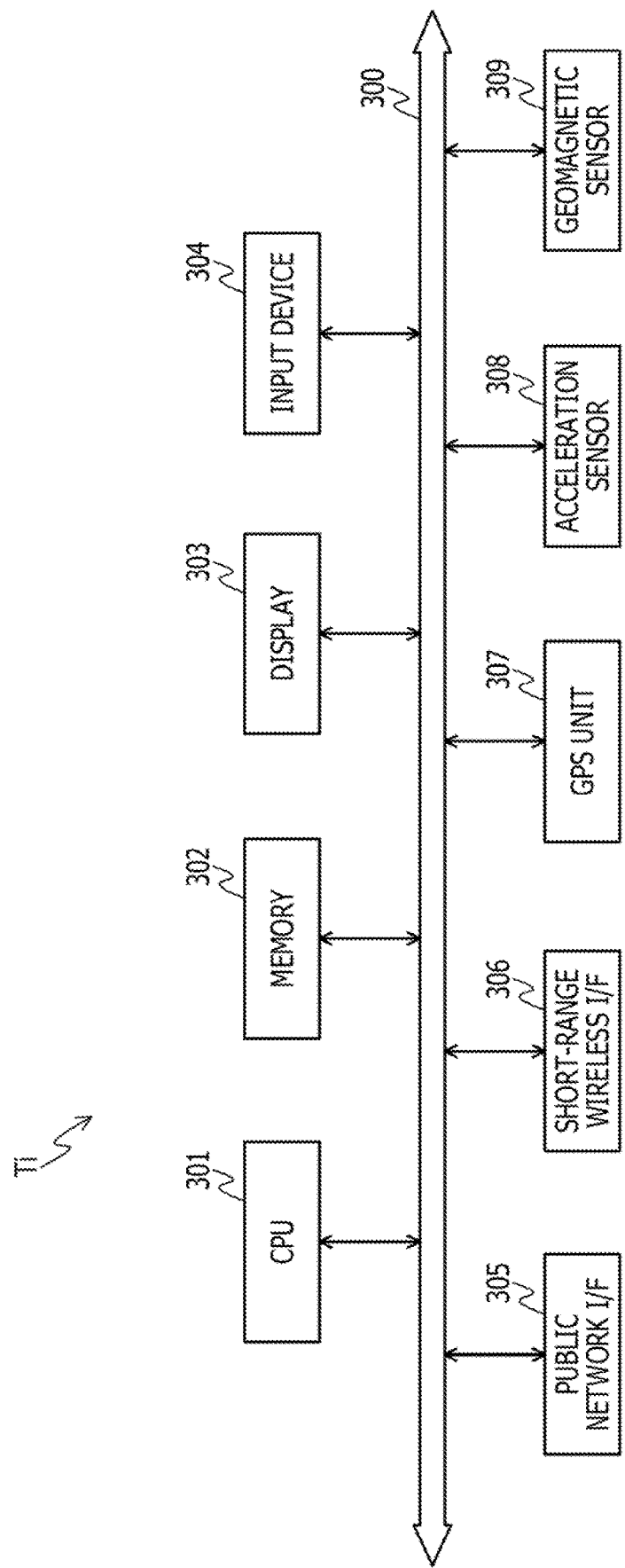
FIG. 3 is a block diagram illustrating a hardware configuration example of a terminal device 11.

FIG. 3 is a block diagram illustrating a hardware configuration example of the terminal device Ti. In FIG. 3, the terminal device Ti Includes a central processing unit (CPU) 301, a memory 302, a display 303, an input device 304, a public network interface (I/F) 305, a short-range wireless I/F 306, a GPS unit 307, an acceleration sensor 308, and a geomagnetic sensor 309. Furthermore, each of the components is Interconnected by a bus 300.

Here, the CPU 301 performs overall control of the terminal device Ti. The memory 302 includes, for example, a read only memory (ROM), a random access memory (RAM), a flash ROM, and the like. Specifically, for example, the flash ROM stores an operating system (OS) program, the ROM stores an application program, and the RAM is used as a work area of the CPU 301. A program stored in the memory 302 is loaded into the CPU 301 to cause the CPU 301 to execute coded processing.

The display 303 displays data such as a document, an image, and function information, as well as a cursor, an icon, and a tool box. As the display 303, for example, a liquid crystal display, an organic electroluminescence (EL) display, or the like, can be adopted.

The input device 304 includes keys for inputting characters, numbers, various instructions, and the like, and performs data input. The input device 304 may be a touch panel-type input pad, a numeric keypad, or the like, or may be a keyboard, a mouse, or the like.

The public network I/F 305 is connected to the network 210 through a communication line, and is connected to another device (the server 201, for example) via the network 210. Then, the public network I/F 305 serves as an interface between the network 210 and the inside of the device, and controls input and output of data to and from another device.

The short-range wireless I/F 306 is connected to a short-range wireless network, and is connected to another device (for example, a wireless LAN access point) via the short-range wireless network. Then, the short-range wireless I/F 306 serves as an interface between the short-range wireless network and the inside of the device, and controls input and output of data to and from another device.

As the public network I/F 305 and the short-range wireless I/F 306, a mobile communication modem, a network communication chip, or the like, can be employed, for example.

The GPS unit 307 receives radio waves from GPS satellites and outputs position information indicating the position of the terminal device Ti. The position information includes, for example, coordinates (latitude and longitude) Indicating the position of the terminal device Ti and information indicating a positioning error included in the position measured using the GPS unit 307. The positioning error is, for example, an error caused by an influence of positions of a plurality of satellites that change from moment to moment, multipath, Ionosphere, troposphere, and the like.

The acceleration sensor 308 detects acceleration. An output value of the acceleration sensor 308 is used by, for example, the CPU 301 for measuring the moving speed of the terminal device Ti. The geomagnetic sensor 309 detects geomagnetism. An output value of the geomagnetic sensor 309 is used by, for example, the CPU 301 for measuring a moving azimuth (moving direction) of the terminal device Ti. The GPS unit 307, the acceleration sensor 308, and the geomagnetic sensor 309 are examples of the sensor 141 illustrated in FIG. 1.

Note that the terminal device Ti may include, for example, a hard disk drive (HDD), a solid state detector (SSD), a gyro sensor, or the like, in addition to the above-described components. Furthermore, in the above description, the case of using a GPS satellite as a positioning satellite has been described as an example. However, for example, a positioning satellite of a quasi-zenith satellite system may be used.

(Hardware Configuration Example of Server 201)

Next, a hardware configuration example of the server 201 illustrated in FIG. 2 will be described.

Figure 4:
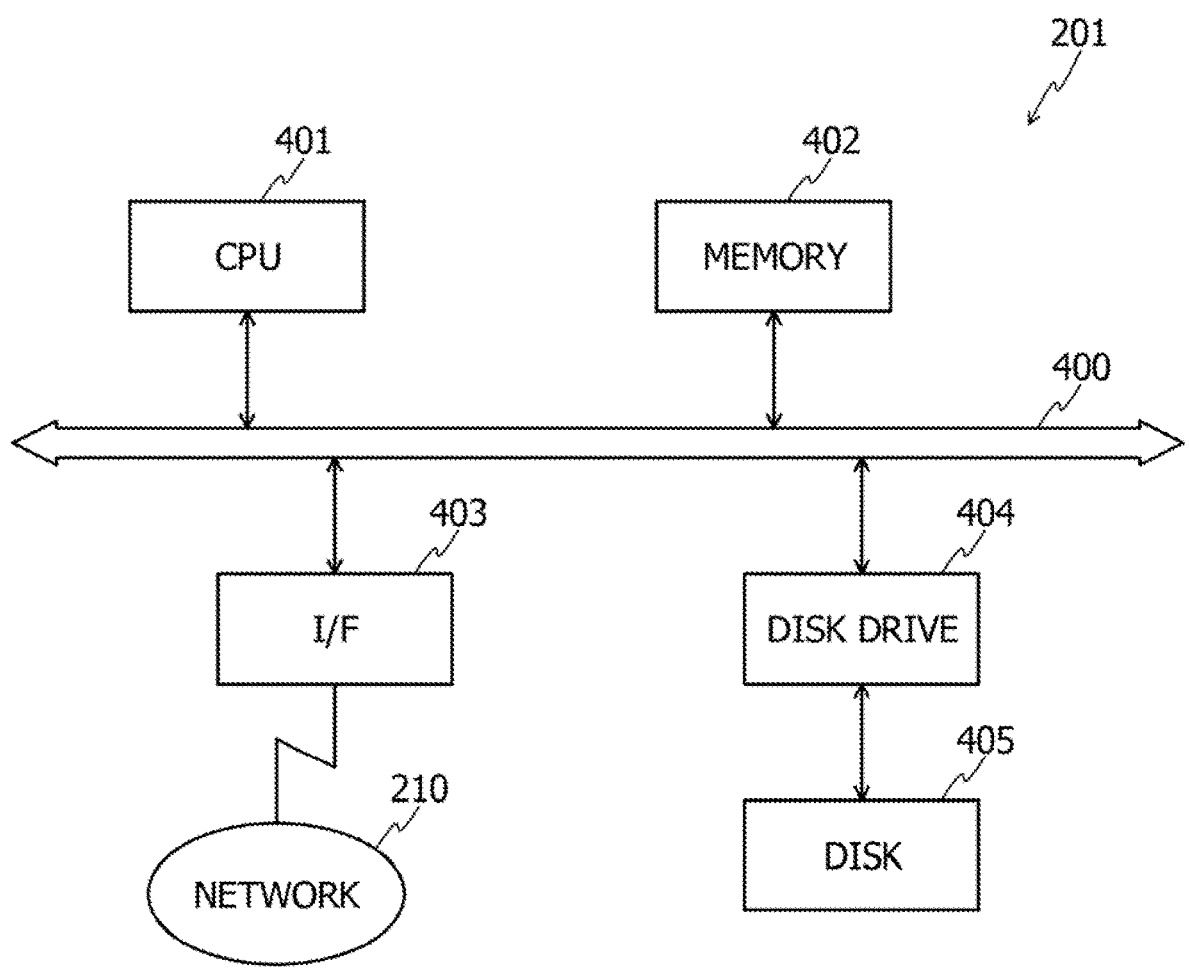
FIG. 4 is a block diagram illustrating a hardware configuration example of a server 201.

FIG. 4 is a block diagram illustrating a hardware configuration example of the server 201. In FIG. 4, the server 201 includes a CPU 401, a memory 402, an I/F 403, a disk drive 404, and a disk 405. Furthermore, each of the components is interconnected by a bus 400.

Here, the CPU 401 performs overall control of the server 201. The memory 402 includes, for example, a ROM, a RAM, a flash ROM, and the like. Specifically, for example, the flash ROM or the ROM stores various programs and the RAM is used as a work area for the CPU 401. A program stored in the memory 402 is loaded into the CPU 401 to cause the CPU 401 to execute coded processing.

The I/F 403 is connected to the network 210 through a communication line, and is connected to another device (for example, the terminal device Ti) via the network 210. Then, the I/F 403 serves as an interface between the network 210 and the inside of the device, and controls input and output of data to and from another device. For example, a modem, a LAN adapter, or the like, can be employed as the I/F 403.

The disk drive 404 controls data read/write of data with respect to the disk 405 according to the control of the CPU 401. The disk 405 stores data written under the control of the disk drive 404. Examples of the disk 405 include a magnetic disk, an optical disk, and the like.

Note that the server 201 may include, for example, an SSD, a keyboard, a mouse, a display, and the like, in addition to the above-described components.

(Stored Content in Various Lists 220, 230, and 240)

Next, the stored content in the various lists 220, 230, and 240 included in the server 201 will be described with reference to FIGS. 5 to 7. The various lists 220, 230, and 240 are stored in a storage device such as the memory 402 or the disk 405 illustrated in FIG. 4, for example.

Figure 5:
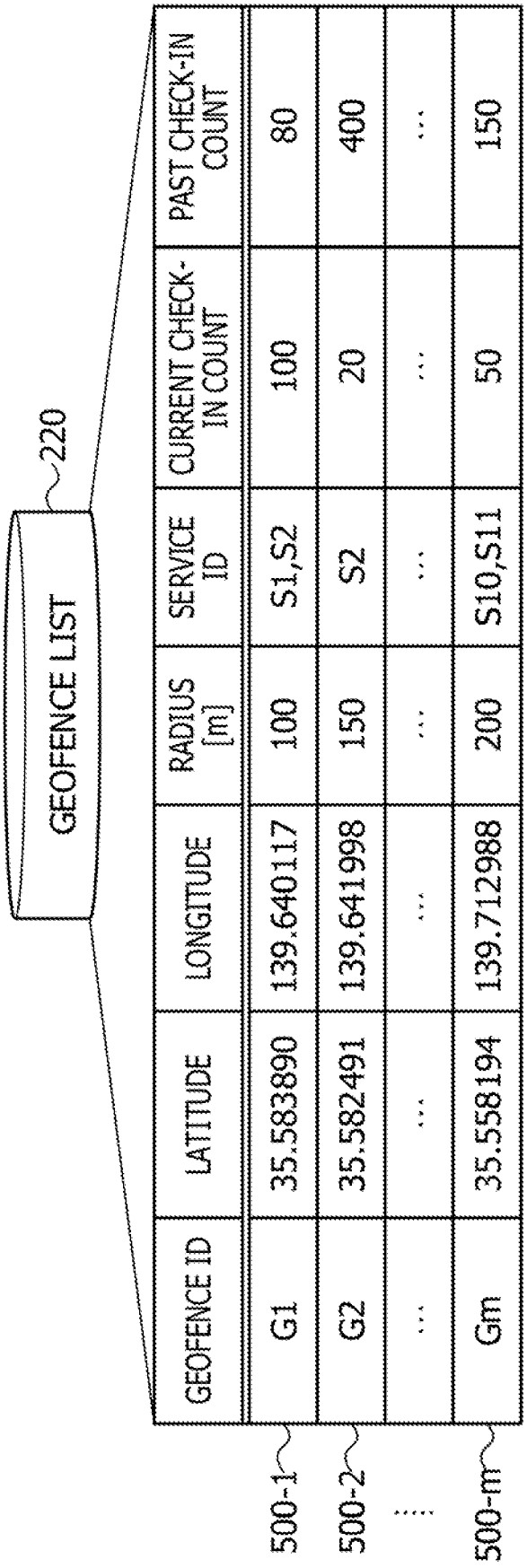
FIG. 5 is an explanatory diagram illustrating an example of stored content in a geofence list 220.

FIG. 5 is an explanatory diagram illustrating an example of the stored content in the geofence list 220. In FIG. 5, the geofence list 220 has fields of a geofence ID, latitude, longitude, a radius, a service ID, a current check-in count, and a past check-in count. By setting information for each field, geofence information 500-1 to 500-$m$ ($m$: a natural number of 2 or larger) is stored as a record.

Here, the geofence ID is an identifier for uniquely identifying a geofence G. The geofence G is an area represented by a geographical boundary line. Here, a case in which the shape of the geofence G is a circular shape is assumed. The "area" described in FIG. 1 corresponds to the geofence G, for example. The latitude and longitude are coordinates (latitude and longitude) of a center point of the geofence G, and are information specifying the position of the geofence G.

The radius is a radius (unit: m) of the geofence G and is information specifying the size of the geofence G. The service ID is an identifier for uniquely identifying a service provided to the user when the user has entered the geofence G. The current check-in count is the number of users present in the geofence G. The past check-in count is the number of users whose entry to the geofence G has been detected within a predetermined period T. The predetermined period T can be arbitrarily set, and is set to, for example, a period such as past several weeks or past several months.

Note that the service ID may be an identifier for uniquely identifying a service provided to the user when the user has left the geofence G. Furthermore, as the service ID, a service ID of a service provided when the user has entered the geofence G and a service ID of a service provided when the user has left the geofence G may be stored.

Figure 6:
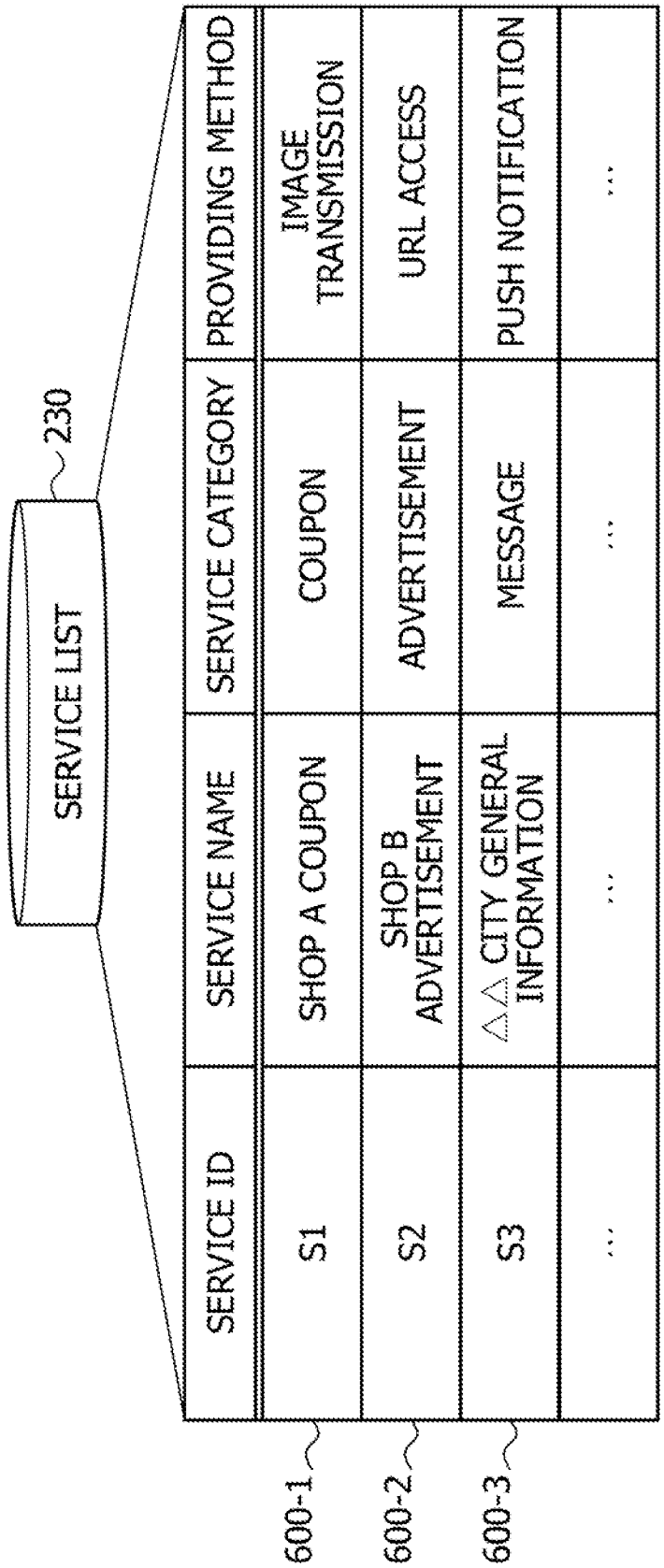
FIG. 6 is an explanatory diagram illustrating an example of stored content in a service list 230.

FIG. 6 is an explanatory diagram illustrating an example of the stored content in the service list 230. In FIG. 6, the service list 230 has fields of a service ID, a service name, a service category, and a providing method, and stores service information (for example, service information 600-1 to 600-3) as a record by setting information for each field.

Here, the service ID is an identifier for uniquely identifying a service provided to the user of the information providing system 200. The service name is a name of the service. The service category is a category of the service. The providing method is a method of providing the service.

Figure 7:
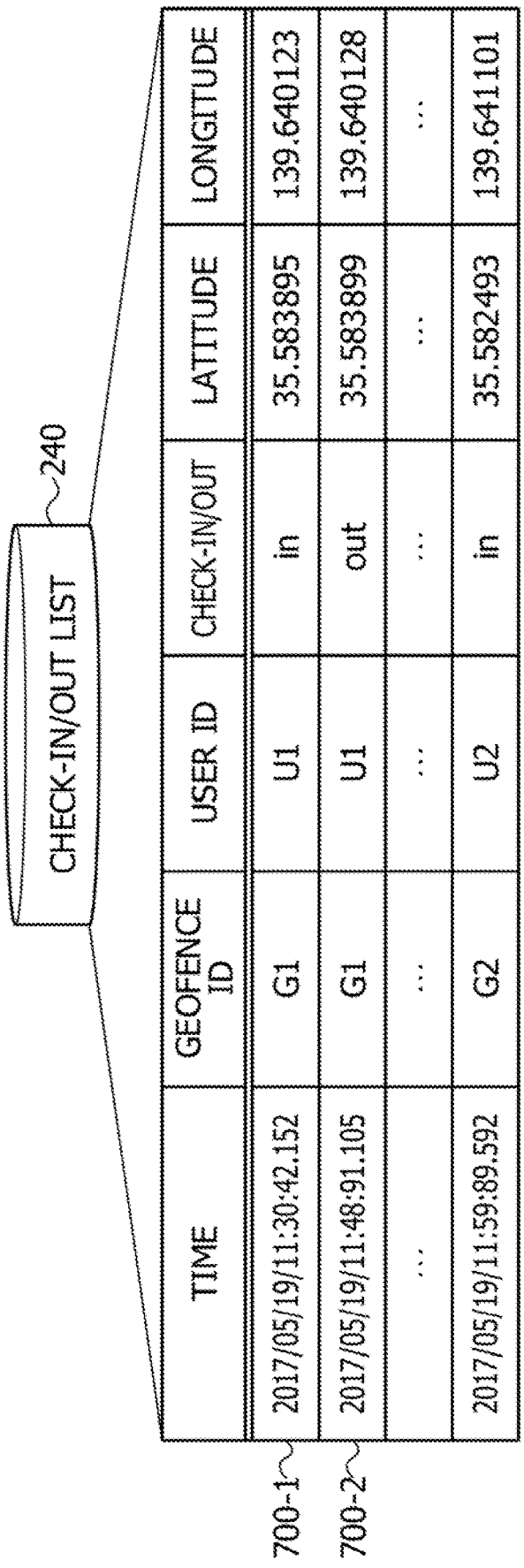
FIG. 7 is an explanatory diagram illustrating an example of stored content of a check-In/out list 240.

FIG. 7 is an explanatory diagram illustrating an example of the stored content of the check-in/out list 240. In FIG. 7, the check-in/out list 240 includes fields of time, a geofence ID, a user ID, check-in/out, latitude, and longitude. By setting information for each field, check-in/out information (for example, check-in/out information 700-1 and 700-2) is stored as a record.

Here, the time is time when entry to the geofence G or leaving from the geofence G has been detected. The geofence ID is an identifier for uniquely identifying the geofence G. The user ID is an identifier for uniquely identifying the user whose entry to the geofence G or leaving from the geofence G has been detected.

The check-in/out indicates which of the entry to the geofence G or the leaving from the geofence G has been detected. Here, the check-in/out "in" Indicates detection of the entry to the geofence G. Furthermore, the check-in/out "out" Indicates detection of the leaving from the geofence G. The latitude and longitude are coordinates (latitude and longitude) Indicating the position of the user when the entry to the geofence G or the leaving from the geofence G has been detected.

Note that the check-in/out list 240 is updated in response to a notification indicating the detection of the entry to the geofence G or the leaving from the geofence G from the terminal device Ti. Furthermore, the server 201 refers to the check-in/out list 240, and updates the current check-in count and the past check-In count in the geofence list 220, for example. Specifically, for example, the server 201 updates the current check-in count and the past check-in count in response to receiving the above described notification from the terminal device Ti.

(Stored Content in Various Tables 250 and 260)

Next, the stored content in the various tables 250 and 260 included in the terminal device Ti will be described with reference to FIGS. 8 and 9. The various tables 250 and 260 are stored in, for example, the memory 302 illustrated in FIG. 3.

FIG. 8 is an explanatory diagram illustrating an example of the stored content in the user situation table 250. In FIG. 8, the user situation table 250 has position information, a moving speed, and a moving azimuth. The position information includes coordinates (x, y) Indicating the position of the terminal device Ti and the positioning error (e). The moving speed indicates a moving speed v of the user having the terminal device Ti (unit: km/h). The moving azimuth indicates a moving azimuth θ of the user having the terminal device Ti (unit: deg). The moving azimuth is represented by an angle with respect to a reference azimuth. Note that the "moving direction" described in FIG. 1 corresponds to the moving azimuth.

Figure 9:
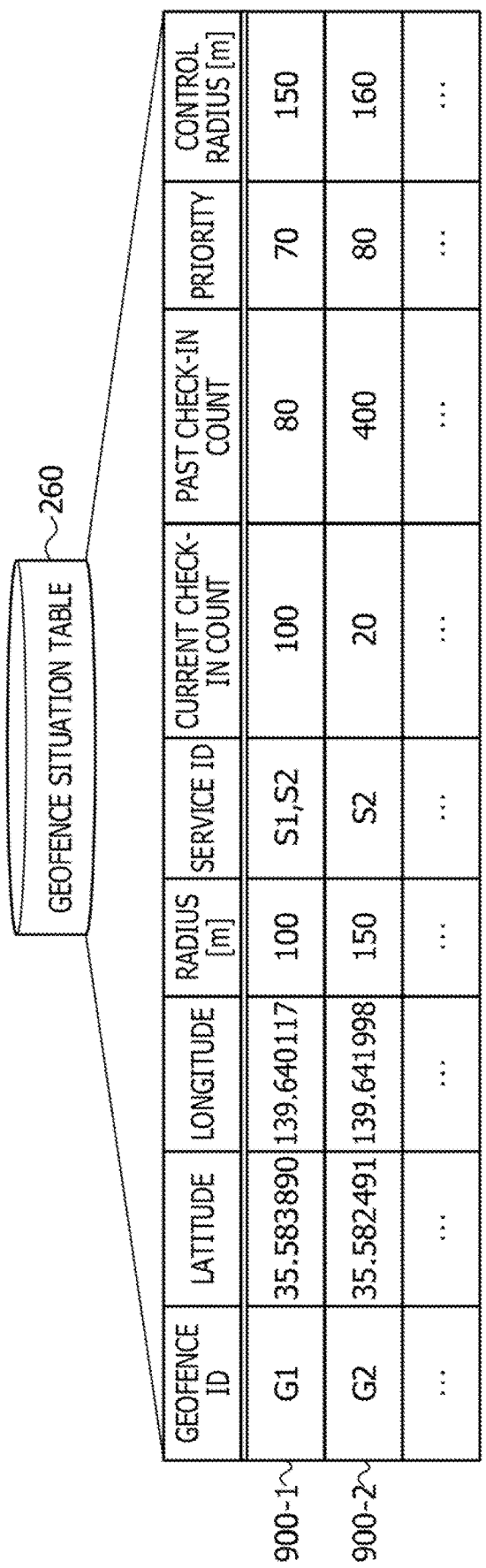
FIG. 9 is an explanatory diagram illustrating an example of stored content in a geofence situation table 260.

FIG. 9 is an explanatory diagram illustrating an example of stored content in a geofence situation table 260. In FIG. 9, the geofence situation table 260 has fields of a geofence ID, latitude, longitude, a radius, a service ID, a current check-in count, a past check-in count, a priority, and a control radius. By setting information for each field, geofence control information (for example, geofence control information 900-1 and 900-2) is stored as a record.

Here, the geofence ID is an identifier for uniquely identifying a target geofence G. The target geofence G is a geofence G to be controlled In radius, and is a geofence G to or from which at least the entry or the leaving of the terminal device Ti is detected. The "target area" described in FIG. 1 corresponds to the target geofence G, for example.

The latitude and longitude are coordinates (latitude and longitude) of a center point of the target geofence G, and are information specifying the position of the target geofence G. The radius is an initial value of the radius of the target geofence G (unit: m). The service ID is an identifier for uniquely identifying a service provided to the user when the user has entered the target geofence G.

The current check-in count is the number of users present in the target geofence G. The past check-in count is the number of users whose entry to the target geofence G has been detected within a predetermined period T. The priority is a priority P of the target geofence G, and is used when controlling the radius of the target geofence G. The control radius is a radius after control of the target geofence G controlled according to the priority P (unit: m).

(Functional Configuration Example of Terminal Device Ti)

Figure 10:
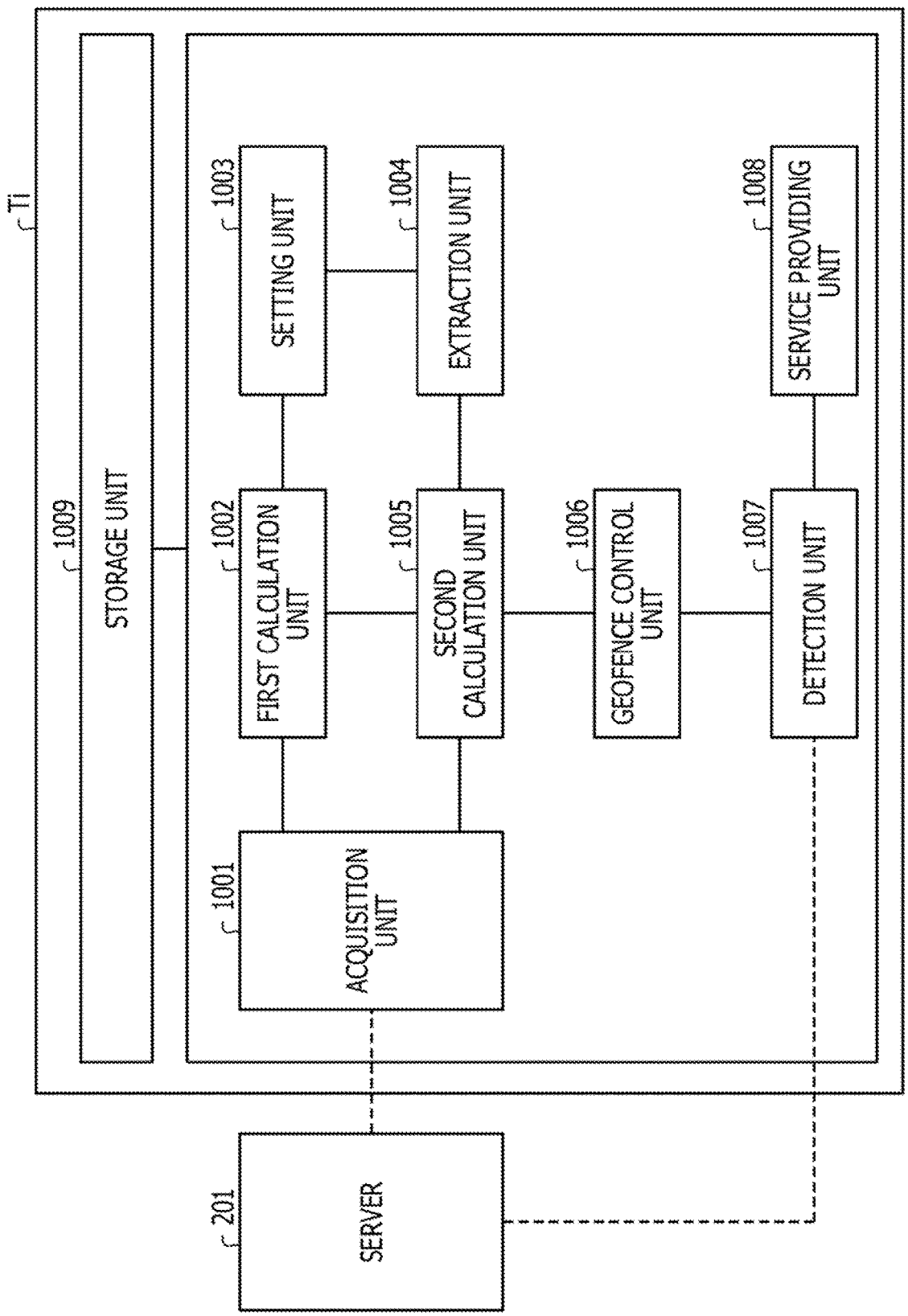
FIG. 10 is a block diagram illustrating a functional configuration example of the terminal device Ti.

FIG. 10 is a block diagram illustrating a functional configuration example of the terminal device Ti. In FIG. 10, the terminal device Ti includes an acquisition unit 1001, a first calculation unit 1002, a setting unit 1003, an extraction unit 1004, a second calculation unit 1005, a geofence control unit 1006, and a detection unit 1007, a service providing unit 1008, and a storage unit 1009. The acquisition unit 1001 to the service providing unit 1008 are functions as a control unit. Specifically, for example, the functions are implemented by causing the CPU 301 to execute the program stored in the memory 302 illustrated in FIG. 3, or by the public network I/F 305 or the short-range wireless I/F 306. Processing result of the functional units are stored in the memory 302, for example. The storage unit 1009 is implemented by the memory 302, for example. Specifically, for example, the storage unit 1009 stores the user situation table 250 (see FIG. 8) and the geofence situation table 260 (see FIG. 9).

The acquisition unit 1001 acquires the geofence information. Specifically, for example, the acquisition unit 1001 inquires of the server 201 the geofence list 220 (see FIG. 5). When receiving the inquiry about the geofence list 220 from the terminal device Ti, the server 201 transmits the geofence information in the geofence list 220 to the terminal device Ti. Then, the acquisition unit 1001 receives the geofence information in the geofence list 220 from the server 201, thereby acquiring the geofence information.

The acquired geofence information is stored in the storage unit 1009. Specifically, for example, the acquired geofence information is stored in a geofence list (terminal side) (not illustrated). Note that the stored content in the geofence list (terminal side) Is similar to the stored content in the geofence list 220 illustrated in FIG. 5, and thus illustration and description are omitted. The geofence list (terminal side) is stored in the storage unit 1009, for example.

Furthermore, the acquisition unit 1001 acquires the service information. Specifically, for example, the acquisition unit 1001 inquires of the server 201 the service list 230 (see FIG. 6). When receiving the inquiry about the service list 230 from the terminal device Ti, the server 201 transmits the service information in the service list 230 to the terminal device Ti. Then, the acquisition unit 1001 receives the service information in the service list 230 from the server 201, thereby acquiring the service information.

The acquired service information is stored in the storage unit 1009. Specifically, for example, the acquired service information is stored in a service list (terminal side) (not illustrated). Note that the stored content in the service list (terminal side) is similar to the stored content in the service list 230 illustrated in FIG. 6, and thus illustration and description are omitted. The service list (terminal side) is stored in the storage unit 1009, for example.

Furthermore, the acquisition unit 1001 acquires the position information of the terminal device Ti. The position information of the terminal device Ti includes coordinates (x, y) indicating the position of the terminal device Ti and the positioning error (e). Specifically, for example, the acquisition unit 1001 acquires the position information output by the GPS unit 307 illustrated in FIG. 3.

An interval for acquiring the position information of the terminal device Ti (hereinafter referred to as "acquisition interval t") can be arbitrarily set. For example, the acquisition interval t is set to a value of about several seconds to several minutes. The acquired position information of the terminal device 11 is stored, for example, in the user situation table 250 illustrated in FIG. 8.

Furthermore, the acquisition unit 1001 acquires data (output value) detected by the acceleration sensor 308 illustrated in FIG. 3. Furthermore, the acquisition unit 1001 acquires data (output value) detected by the geomagnetic sensor 309 illustrated in FIG. 3.

The first calculation unit 1002 calculates a moving speed v of the terminal device 11. Specifically, for example, the first calculation unit 1002 calculates the moving speed v of the terminal device Ti on the basis of the acquired position information of the terminal device Ti and the acquired data of the acceleration sensor 308. The calculated moving speed v is stored in the user situation table 250, for example.

Furthermore, the first calculation unit 1002 calculates the moving azimuth θ of the terminal device Ti. Specifically, for example, the first calculation unit 1002 calculates the moving azimuth θ of the terminal device Ti on the basis of the acquired position information of the terminal device Ti and the acquired data of the geomagnetic sensor 309. The calculated moving azimuth θ is stored in the user situation table 250, for example.

The setting unit 1003 sets a search range SR on the basis of the calculated moving speed v and moving azimuth θ of the terminal device 11. Here, the search range SR is a range for searching for the target geofence G. The shape of the search range SR is a circular shape. However, the shape of the search range SR may be a shape other than a circle. The "predetermined range 130" described in FIG. 1 corresponds to the search range SR, for example.

Specifically, for example, the setting unit 1003 calculates the position of the terminal device Ti at any point of time on or after the point of time when the position information of the terminal device Ti has been acquired, on the basis of the moving speed v and the moving azimuth θ of the terminal device Ti and the acquisition interval t of the position information of the terminal device Ti. In other words, the setting unit 1003 calculates the position where the terminal device Ti is estimated to reach in the future.

Then, the setting unit 1003 may set the search range SR centered on the calculated position of the terminal device Ti on the basis of the moving speed v of the terminal device Ti and the positioning error e of the position information of the terminal device Ti. Thereby, the search range SR centered on the position where the terminal device Ti is estimated to reach in the future can be set.

Note that the example of setting the search range SR will be described below with reference to FIGS. 11 to 13.

The extraction unit 1004 extracts the target geofence G within the set search range SR. Specifically, for example, the extraction unit 1004 refers to the geofence list (terminal side) (not illustrated) and extracts a geofence G with the center point included within the search range SR as the target geofence G. Furthermore, the extraction unit 1004 may extract a geofence G entirely included in the search range SR as the target geofence G.

The geofence information of the extracted target geofence G is stored in, for example, the geofence situation table 260 illustrated in FIG. 9. As a result, new geofence control information is registered in the geofence situation table 260. Note that, at this point of time, the priority and the control radius of the new geofence control information are "-(null)".

Note that examples of extracting the target geofence G will be described with reference to FIGS. 11 to 13. In the following description, one or more target geofences G extracted by the extraction unit 1004 may be described as "target geofence set". Furthermore, an arbitrary target geofence G in the target geofence set may be described as "target geofence Gj" (=1, 2, . . . , m).

The second calculation unit 1005 calculates a priority Pj of the extracted target geofence Gj. Here, the priority Pj of the target geofence G includes, for example, a first priority, a second priority, a third priority, and a fourth priority to be described below.

First Priority

The second calculation unit 1005 calculates, for each of the extracted target geofences Gj, an angle θj of an azimuth from the terminal device Ti to the target geofence Gj with respect to the moving azimuth θ of the terminal device Ti. Specifically, for example, the second calculation unit 1005 calculates the angle θj on the basis of the position information of the terminal device Ti, the moving azimuth θ of the terminal device Ti, and the position of the target geofence G. In other words, the second calculation unit 1005 calculates the angle θj (relative azimuth) representing in which direction the target geofence G is located as viewed from the terminal device Ti. Then, the second calculation unit 1005 calculates the first priority according to the calculated angle θj.

Note that a calculation example in a case of calculating a first priority as the priority Pj of the target geofence Gj will be described below with reference to FIG. 14.

Second Priority

The second calculation unit 1005 calculates, for each of the extracted target geofences Gj, a distance dj from the terminal device Ti to the target geofence Gj on the basis of the position information of the terminal device Ti and the position of the target geofence Gj. Then, the second calculation unit 1005 calculates the second priority according to the calculated distance dj.

Note that a calculation example in a case of calculating the second priority as the priority Pj of the target geofence Gj will be described below with reference to FIG. 15.

Third Priority

The second calculation unit 1005 calculates, for each of the extracted target geofences Gj, the third priority according to the number of users whose entry to the target geofence Gj has been detected within the predetermined period T. In the following description, the number of users whose entry to the target geofence Gj has been detected within the predetermined period T may be described as "past check-in count pcc (j)" (pcc: past check-in count).

The predetermined period T is, for example, a period such as past several weeks or past several months. For this reason, the past check-in count pcc (j) can be said to represent the degree of popularity of a shop or the like that provides a service corresponding to the target geofence Gj. In other words, the third priority is a priority according to the degree of popularity of a shop or the like that provides a service corresponding to the target geofence Gj.

Furthermore, the second calculation unit 1005 may calculate, for each of the extracted target geofences Gj, the third priority according to the number of users present in the target geofence Gj. In the following description, the number of users present in the target geofence Gj may be described as "current check-in count ccc (j)" (ccc: current check-in count).

The current check-in count ccc (j) corresponds to the number of users currently present in the target geofence Gj and can be said to represent the degree of congestion of the target geofence Gj. In this case, the third priority is a priority according to the degree of congestion of the target geofence Gj. Furthermore, the second calculation unit 1005 may calculate the third priority of the target geofence Gj on the basis of the past check-in count pcc (j) and the current check-in count ccc (j).

Note that a calculation example in a case of calculating a third priority as the priority Pj of the target geofence Gj will be described below with reference to FIG. 16.

Fourth Priority

The second calculation unit 1005 calculates, for each of the extracted target geofences Gj, an average value of distances between the target geofence Gj and other target geofences Gk on the basis of the position of the target geofence G and positions of the other target geofences Gk (k≠j, k=1, 2, . . . , m). In the following description, the average value of distances between the target geofence Gj and other target geofences Gk may be described as "Inter-point average distance adj".

Then, the second calculation unit 1005 calculates the fourth priority according to the calculated inter-point average distance adj. Here, the inter-point average distance adj can be said to represent geofence density around the target geofence Gj. In other words, the fourth priority is a priority according to the geofence density around the target geofence Gj.

Note that a calculation example in a case of calculating the fourth priority as the priority Pj of the target geofence Gj will be described below with reference to FIG. 17.

Furthermore, the second calculation unit 1005 calculates the priority Pj of the target geofence Gj on the basis of at least two or more priorities of the first priority, second priority, third priority, and fourth priority. Specifically, for example, the second calculation unit 1005 may calculate the priority Pj of the target geofence Gj by multiplying the two or more priorities or by multiplying the two or more priorities by a coefficient and adding the multiplied priorities.

The calculated priority Pj of the target geofence Gj is stored in the geofence situation table 260. Specifically, the calculated priority Pj of the target geofence Gj Is set in the priority field of the target geofence Gj in the geofence situation table 260.

The geofence control unit 1006 controls the size of the target geofence Gj on the basis of the calculated priority Pj of the target geofence Gj. At this time, the geofence control unit 1006 may control the size of the target geofence Gj on the basis of the priority Pj of the target geofence Gj according to a result of comparison between a radius rj of the target geofence Gj and a reference distance D.

The reference distance D can be arbitrarily set. For example, if the radius rj of the target geofence Gj is larger than the reference distance D, the target geofence Gj is set to a value that can be said to be sufficiently large. The reference distance D may be a fixed value or may be calculated according to the situation of the target geofence set.

Specifically, for example, the geofence control unit 1006 controls the radius rj of the target geofence Gj on the basis of the priority Pj of the target geofence Gj in a case where the radius rj of the target geofence Gj is equal to or smaller than the reference distance D. On the other hand, in a case where the radius rj of the target geofence Gj Is larger than the reference distance D, the geofence control unit 1006 may not control the radius rj of the target geofence Gj.

Furthermore, the geofence control unit 1006 may control the size of the target geofence Gj on the basis of the priority Pj of the target geofence Gj so as not to allow the target geofence Gj and another target geofence Gk to overlap.

The controlled size of the target geofence Gj is stored in the geofence situation table 260. Specifically, the controlled radius rj of the target geofence Gj is set in the control radius field of the target geofence Gj in the geofence situation table 260.

Note that examples of controlling the size (radius rj) of the target geofence Gj will be described below with reference to FIGS. 18 to 20.

The detection unit 1007 detects at least either the entry to the target geofence Gj or the leaving from the target geofence Gj of the terminal device Ti on the basis of the controlled size of the target geofence Gj. The range of the target geofence Gj Is specified according to the latitude, longitude, and control radius of the target geofence Gj in the geofence situation table 260.

Specifically, for example, the detection unit 1007 determines whether the position of the terminal device Ti Is inside the target geofence Gj on the basis of the position information of the terminal device Ti, and the latitude, longitude, and control radius of the target geofence Gj in the geofence situation table 260. Here, the detection unit 1007 detects the entry of the terminal device Ti to the target geofence Gj in the case where the position of the terminal device Ti is inside the target geofence Gj.

Furthermore, the detection unit 1007 determines whether the position of the terminal device Ti is outside the target geofence Gj on the basis of the position information of the terminal device Ti, and the latitude, longitude, and control radius of the target geofence Gj in the geofence situation table 260. Here, the detection unit 1007 detects the leaving of the terminal device Ti from the target geofence Gj in the case where the position of the terminal device Ti is outside the target geofence Gj.

Note that, in the case where the detection unit 1007 has detected the entry to the target geofence Gj or the leaving from the target geofence Gj of the terminal device Ti, the detection unit 1007 notifies the server 201 of the entry or the leaving. At this time, information (for example, the user ID) for identifying the user of the terminal device Ti may be notified together.

The service providing unit 1008 outputs information regarding a service corresponding to the target geofence Gj in response to the detection of at least either the entry to the target geofence Gj or the leaving from the target geofence Gj of the terminal device Ti. Specifically, for example, the service providing unit 1008 refers to the geofence situation table 260 and specifies the service ID of the target geofence Gj in response to the detection of the entry of the terminal device Ti to the target geofence Gj.

Next, the service providing unit 1008 refers to the service list (terminal side) (not illustrated) and acquires the service information corresponding to the specified service ID. Then, the service providing unit 1008 outputs the information regarding the service corresponding to the target geofence Gj on the basis of the acquired service information.

For example, in a case where the service information providing method is "image transmission", the service providing unit 1008 downloads an image (for example, a coupon image) from a predetermined computer via the short-range wireless I/F 306 or the public network I/F 305 and displays the image on the display 303 illustrated in FIG. 3. Note that the image (for example, the coupon image) may be downloaded in advance and stored in the memory 302.

Furthermore, in a case where the service information providing method is "URL access", the service providing unit 1008 displays information (for example, advertisement information) on the display 303, the information being obtained by accessing a uniform resource locator (URL) designated in advance via the short-range wireless I/F 306 or the public network I/F 305. Furthermore, in a case where the service information providing method is "PUSH notification", the service providing unit 1008 receives a message or the like, through PUSH notification, from a predetermined computer via the short-range wireless I/F 306 or the public network I/F 305, and displays the message or the like on the display 303.

Note that each functional unit of the terminal device Ti may be implemented by another computer different from the terminal device Ti in the information providing system 200, for example, the server 201. Furthermore, each functional unit of the terminal device Ti may be implemented by a plurality of computers in the information providing system 200, for example, the terminal device 11 and the server 201.

(Example of Setting Search Range SR and Example of Extracting Target Geofence G)

Next, an example of setting the search range SR and an example of extracting the target geofence G will be described with reference to FIGS. 11 to 13.

Figure 11:
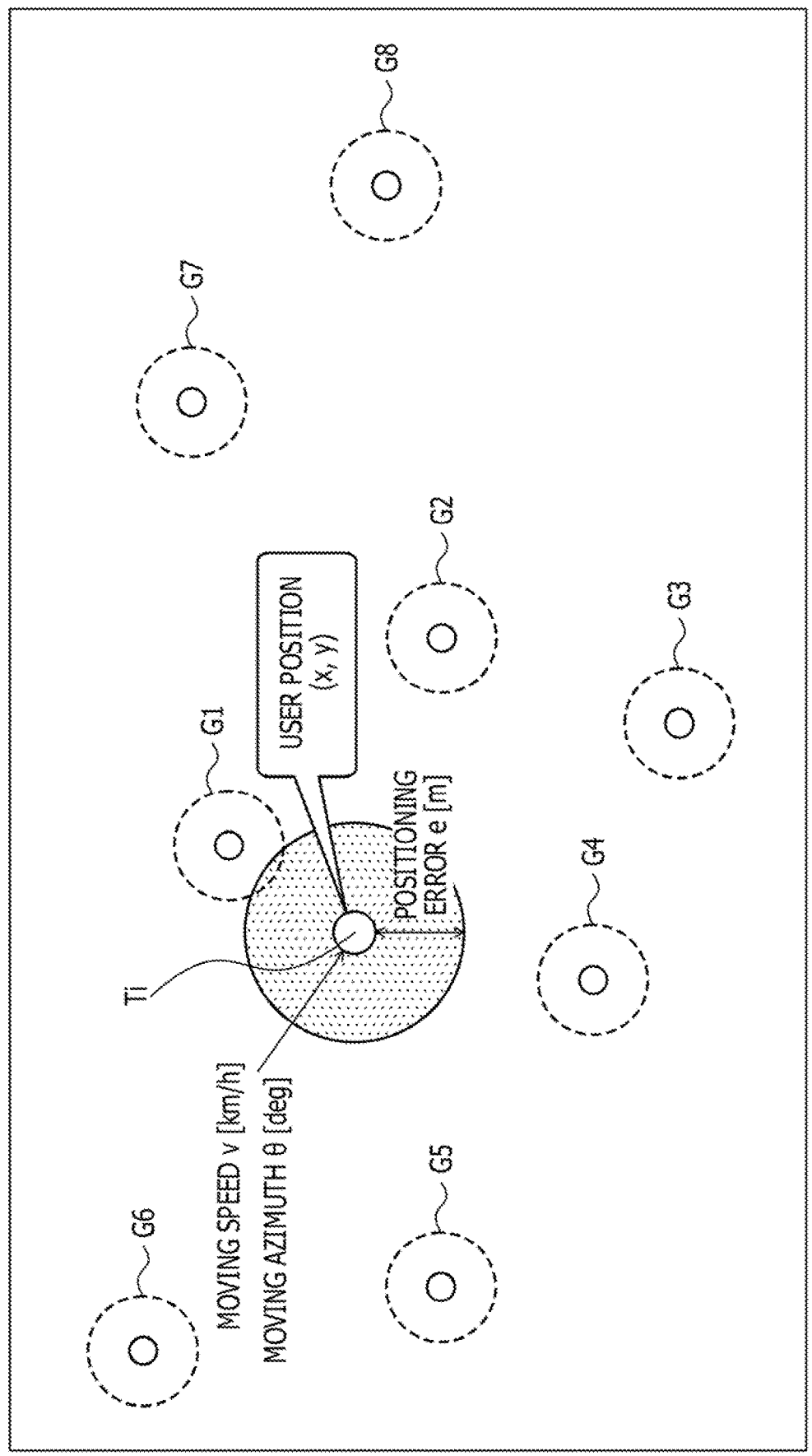
FIG. 11 is an explanatory diagram (part 1) illustrating an example of setting a search range SR and an example of extracting a target geofence G.
Figure 12:
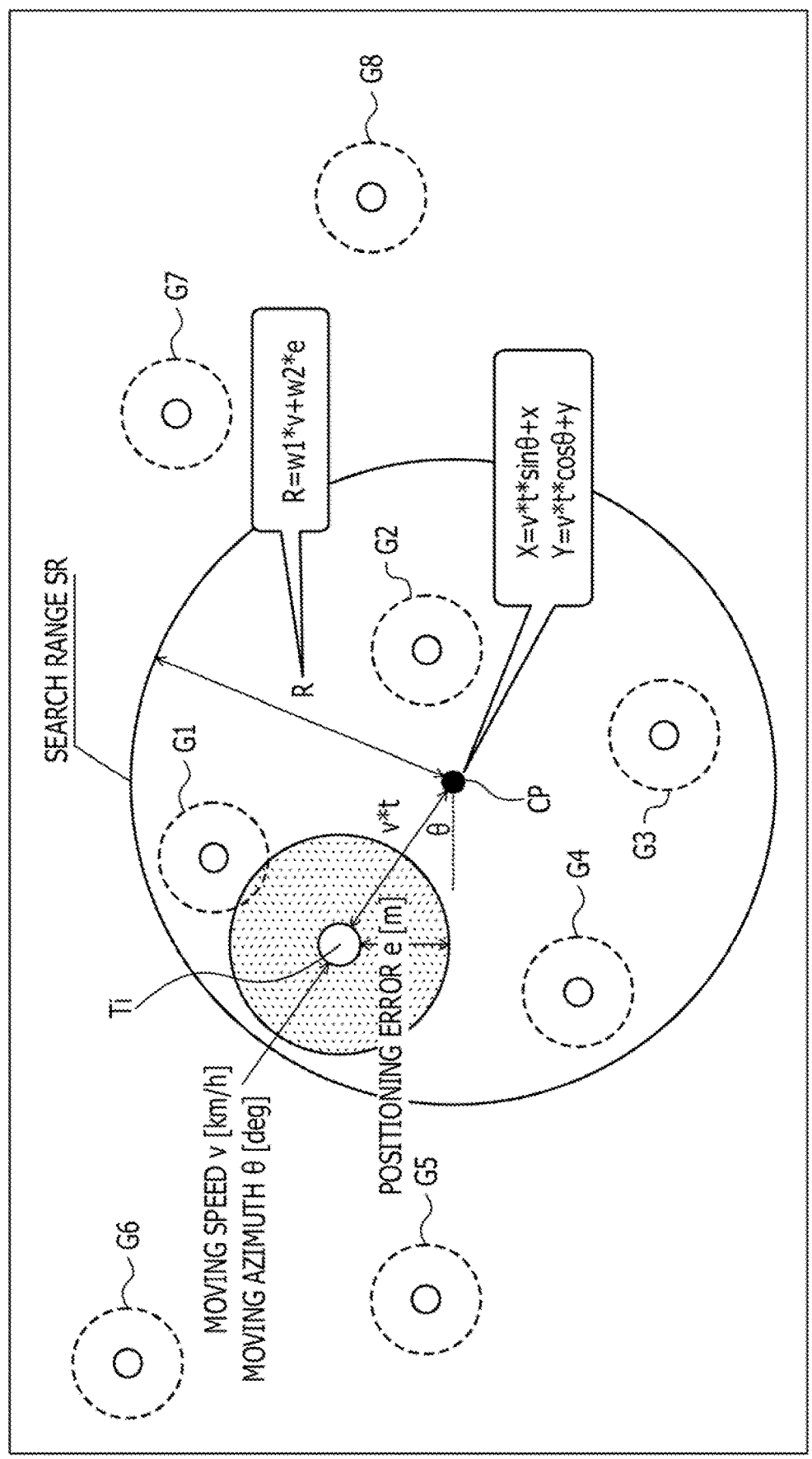
FIG. 12 is an explanatory diagram (part 2) Illustrating an example of setting the search range SR and an example of extracting the target geofence G.
Figure 13:
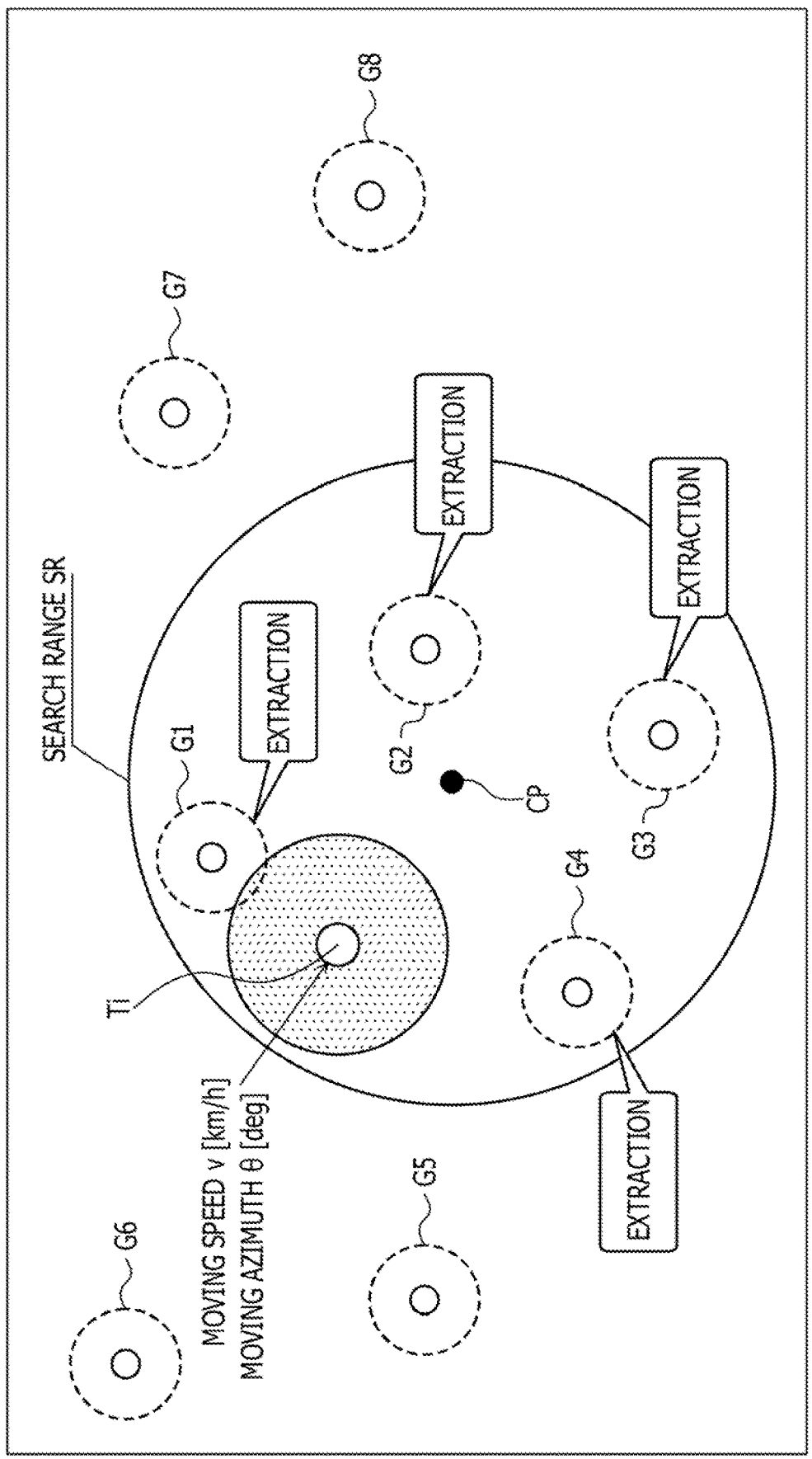
FIG. 13 is an explanatory diagram (part 3) Illustrating an example of setting the search range SR and an example of extracting the target geofence G.

FIGS. 11 to 13 are explanatory diagrams illustrating examples of setting the search range SR and examples of extracting the target geofence G. FIG. 11 illustrates geofences G1 to G8. Furthermore, FIG. 11 illustrates coordinates (x, y) indicating the position of the terminal device Ti, in other words, the position of the user of the terminal device Ti. Furthermore, FIG. 11 illustrates the positioning error e of the position information of the terminal device Ti. The first calculation unit 1002 calculates the moving speed v and the moving azimuth θ of the terminal device Ti.

In FIG. 12, the setting unit 1003 sets the search range SR. Specifically, for example, the setting unit 1003 calculates the coordinates (X, Y) of a center point CP of the search range SR using the following expressions (1) and (2). The center point CP corresponds to a point where next acquisition of the position information of the terminal device Ti is estimated. Note that v is the moving speed of the terminal device Ti. θ is the moving azimuth of the terminal device Ti. t is the acquisition interval of the position information of the terminal device Ti. x and y are the latitude and longitude indicating the position of the user of the terminal device Ti.

$$X = v*t*\sin\theta + x \quad (1)$$

$$Y = v*t*\cos\theta + y \quad (2)$$

Next, the setting unit 1003 calculates the radius R of the search range SR using, for example, the following expression (3). Note that w1 and w2 are weighting factors. v is the moving speed of the terminal device Ti. e is the positioning error. Note that, although the moving speed v [km/h] and the positioning error e [m] are different in unit, they can be adjusted by the weighting factors w1 and w2.

$$R = w1*v + w2*e \tag{3}$$

Thereby, the search range SR having the radius R centered on the point (center point CP) where next acquisition of the position information of the terminal device Ti is estimated can be set.

In FIG. 13, the extraction unit 1004 extracts the target geofence G within the search range SR. Here, the geofences G1 to G4 with the center points included in the search range SR are extracted as the target geofences G. Thereby, the geofences G around the point where next acquisition of the position information of the terminal device Ti is estimated can be narrowed down. In other words, the geofence G that is unlikely to be headed by the user of the terminal device Ti can be excluded from the target geofence G. In a case of controlling (expanding) the radius of a geofence G in a direction in which the user passed in the past, there is a possibility that the user may be treated to re-enter a geofence G in which the user has been notified in the past. In this case, the user receives the notification corresponding to the same geofence G a plurality of times. This becomes an excessive notification for the user. Therefore, the present example can reduce the possibility that the user receives an excessive notification by controlling (expanding) the radius of the geofence G in the direction in which the user is heading.

First Priority Calculation Example

Next, a calculation example in the case of calculating the first priority as the priority Pj of the target geofence Gj will be described with reference to FIG. 14.

Figure 14:
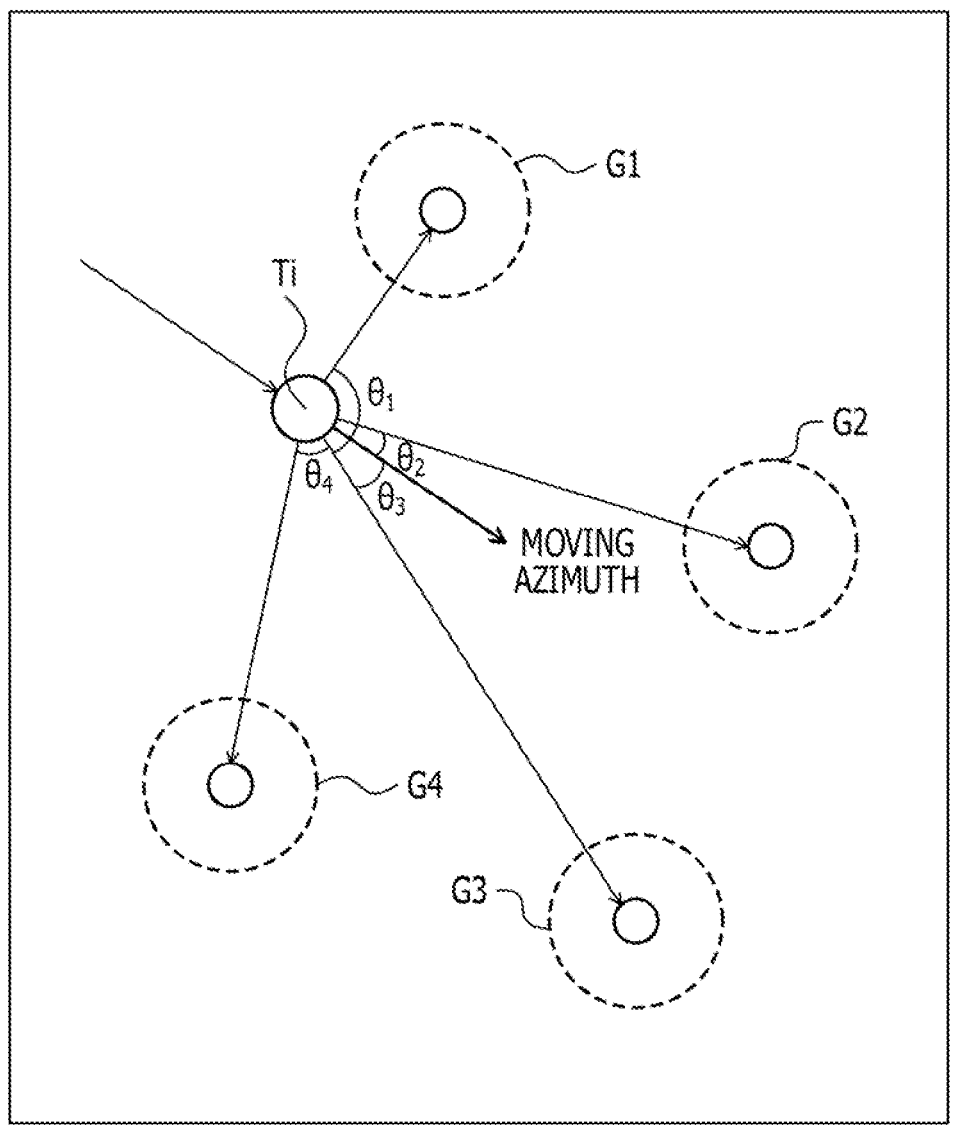
FIG. 14 is an explanatory diagram illustrating an example of calculating a first priority.

FIG. 14 is an explanatory diagram illustrating an example of calculating the first priority. FIG. 14 illustrates target geofences G1 to G4. First, the second calculation unit 1005 calculates angles θ1 to θ4 on the basis of the position information (x, y) of the terminal device Ti, the moving azimuth θ of the terminal device Ti, and the positions (latitude and longitude) of the target geofences G1 to G4.

Each of the angles θ1 to θ4 is an angle of the azimuth from the terminal device Ti to each of the target geofences G1 to G4 with respect to the moving azimuth θ of the terminal device Ti. Next, the second calculation unit 1005 calculates priorities P1 to P4 (first priorities) of the target geofences G1 to G4 using the following expression (4).

$$Pj = \theta j \tag{4}$$

Thereby, a higher priority Pj (first priority) can be calculated for the target geofence Gj that can be said to have a larger relative angle of the azimuth of the target geofence G with respect to the moving azimuth θ and have a lower possibility that the user of the terminal device Ti is headed to, of the target geofences G1 to G4.

Note that the second calculation unit 1005 may calculate reciprocals of the angles θ1 to θ4 as the priorities P1 to P4 of the target geofences G1 to G4. Thereby, a higher priority Pj (first priority) can be calculated for the target geofence Gj that can be said to have a smaller relative angle of the azimuth of the target geofence G with respect to the moving azimuth θ and have a higher possibility that the user of the terminal device Ti is headed to, of the target geofences G1 to G4.

Second Priority Calculation Example

Next, a calculation example in the case of calculating the second priority as the priority Pj of the target geofence Gj will be described with reference to FIG. 15.

Figure 15:
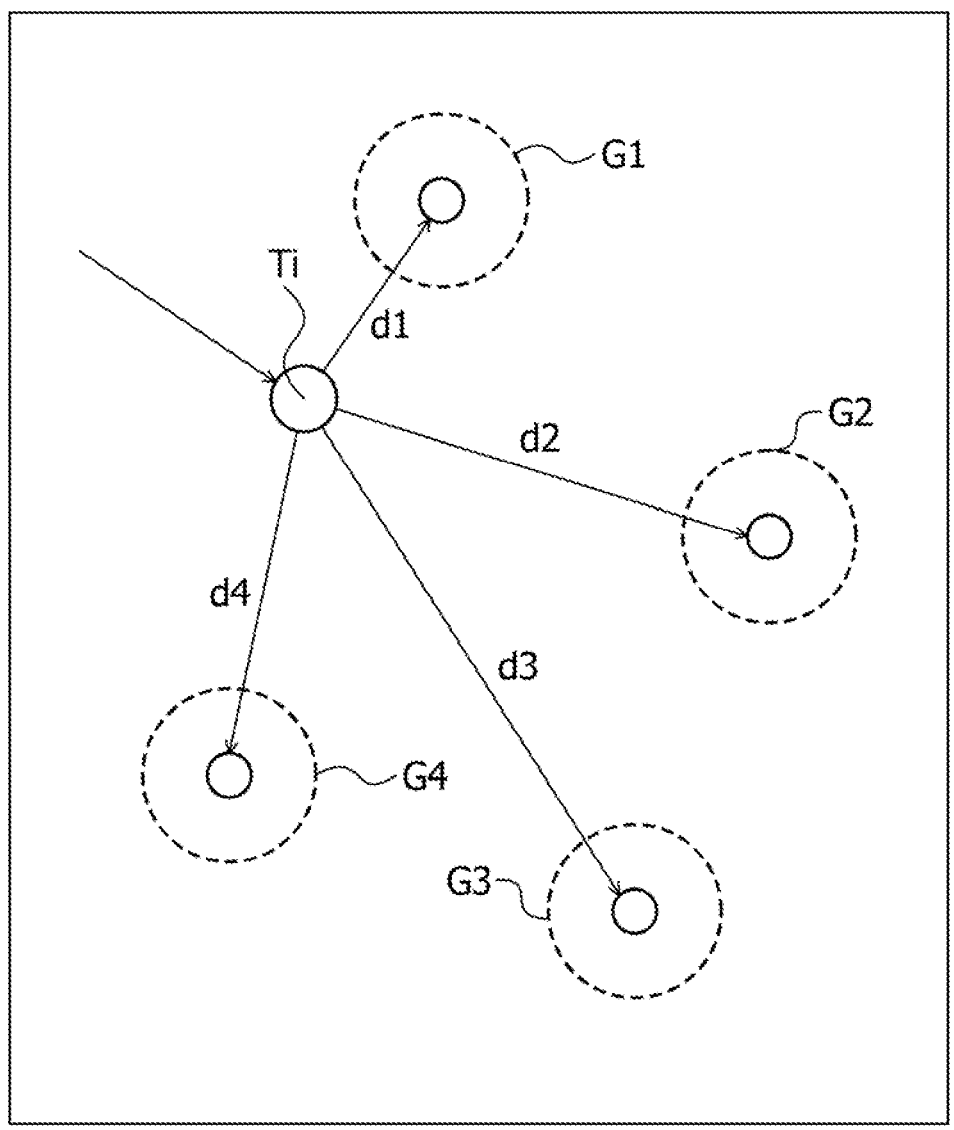
FIG. 15 is an explanatory diagram illustrating an example of calculating a second priority.

FIG. 15 is an explanatory diagram illustrating an example of calculating the second priority. FIG. 15 illustrates target geofences G1 to G4. First, the second calculation unit 1005 calculates distances d1 to d4 from the terminal device Ti to the target geofences G1 to G4 on the basis of the position information (x, y) of the terminal device Ti and the positions (latitude and longitude) of the target geofences Gi to G4.

Next, the second calculation unit 1005 calculates priorities P1 to P4 (second priorities) of the target geofences G1 to G4 using the following expression (5).

$$Pj = 1/dj \tag{5}$$

Thereby, a higher priority Pj (second priority) can be calculated for the target geofence Gj that can be said to be located at a distance farther from the user of the terminal device Ti and have a lower possibility that the user of the terminal device Ti is headed to, of the target geofences G1 to G4.

Note that the second calculation unit 1005 may calculate distances d1 to d4 as the priorities P1 to P4 of the target geofences G1 to G4. Thereby, a higher priority Pj (second priority) can be calculated for the target geofence Gj at a distance closer to the user of the terminal device Ti and having a higher possibility that the user of the terminal device Ti is headed to, of the target geofences G1 to G4.

Third Priority Calculation Example

Next, a calculation example in a case of calculating a third priority as the priority Pj of the target geofence Gj will be described with reference to FIG. 16.

Figure 16:
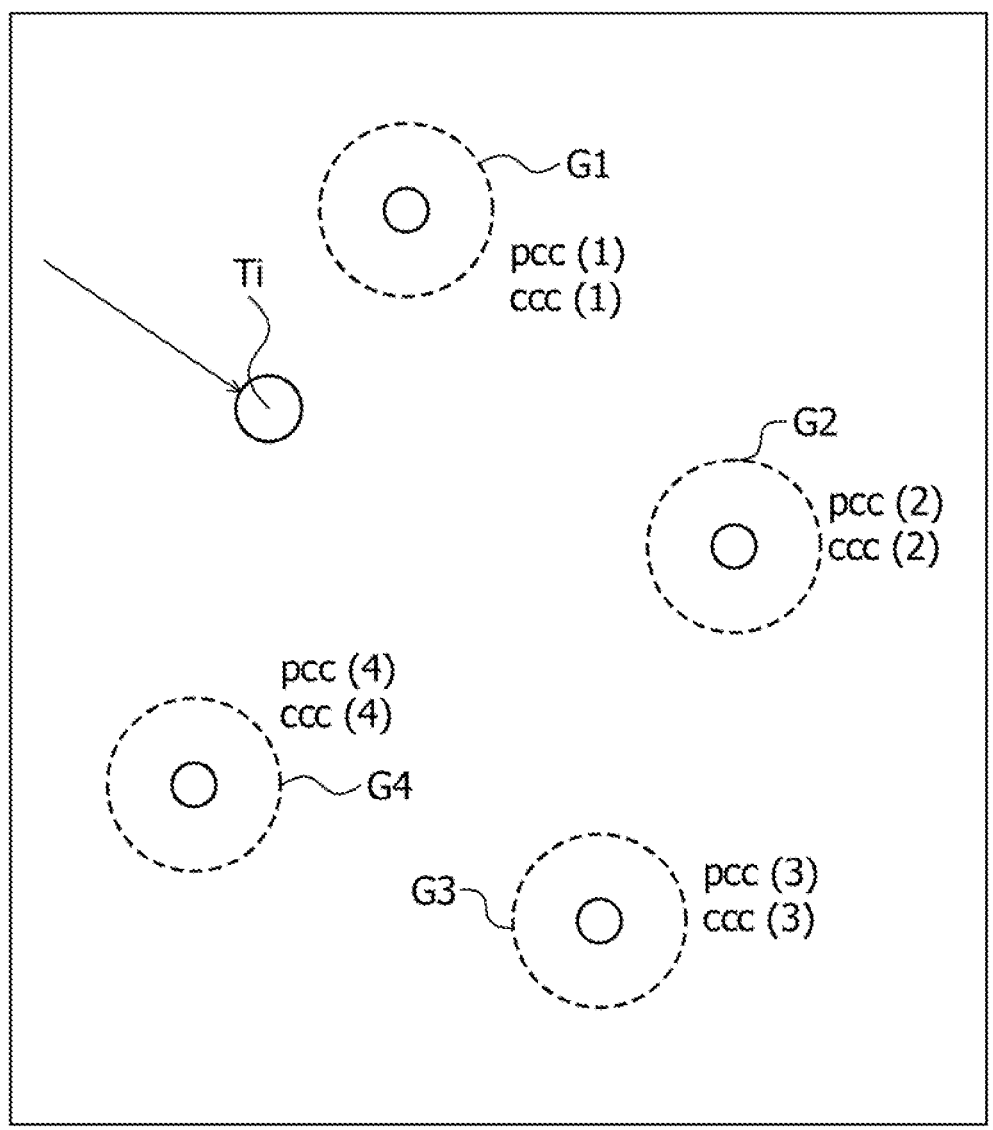
FIG. 16 is an explanatory diagram illustrating an example of calculating a third priority.

FIG. 16 is an explanatory diagram illustrating an example of calculating a third priority. FIG. 16 illustrates target geofences Gi to G4. First, the second calculation unit 1005 refers to the geofence situation table 260, and specifies past check-in counts pcc (1) to pcc (4) or current check-in counts ccc (1) to ccc (4) of the target geofences G1 to G4.

Next, the second calculation unit 1005 calculates priorities P1 to P4 (third priorities) of the target geofences G1 to G4 using the following expression (6) or (7).

$$Pj = 1/pcc(j) \tag{6}$$

$$Pj = 1/ccc(j) \tag{7}$$

Thereby, a higher priority Pj (third priority) can be calculated for the target geofence Gj having a smaller past check-in count and a lower degree of popularity, or having a smaller current check-in count and a lower degree of congestion, of the target geofences G1 to G4.

Note that the second calculation unit 1005 may calculate the past check-in counts pcc (1) to pcc (4) or the current check-in counts ccc (1) to ccc (4) as the priorities P1 to P4 of the target geofences G1 to G4. Thereby, a higher priority Pj (third priority) can be calculated for the target geofence Gj having a larger past check-in count and a higher degree of popularity, or having a larger current check-in count and a higher degree of congestion, of the target geofences G1 to G4.

Fourth Priority Calculation Example

Next, a calculation example in a case of calculating a fourth priority as the priority Pj of the target geofence Gj will be described with reference to FIG. 17.

Figure 17:
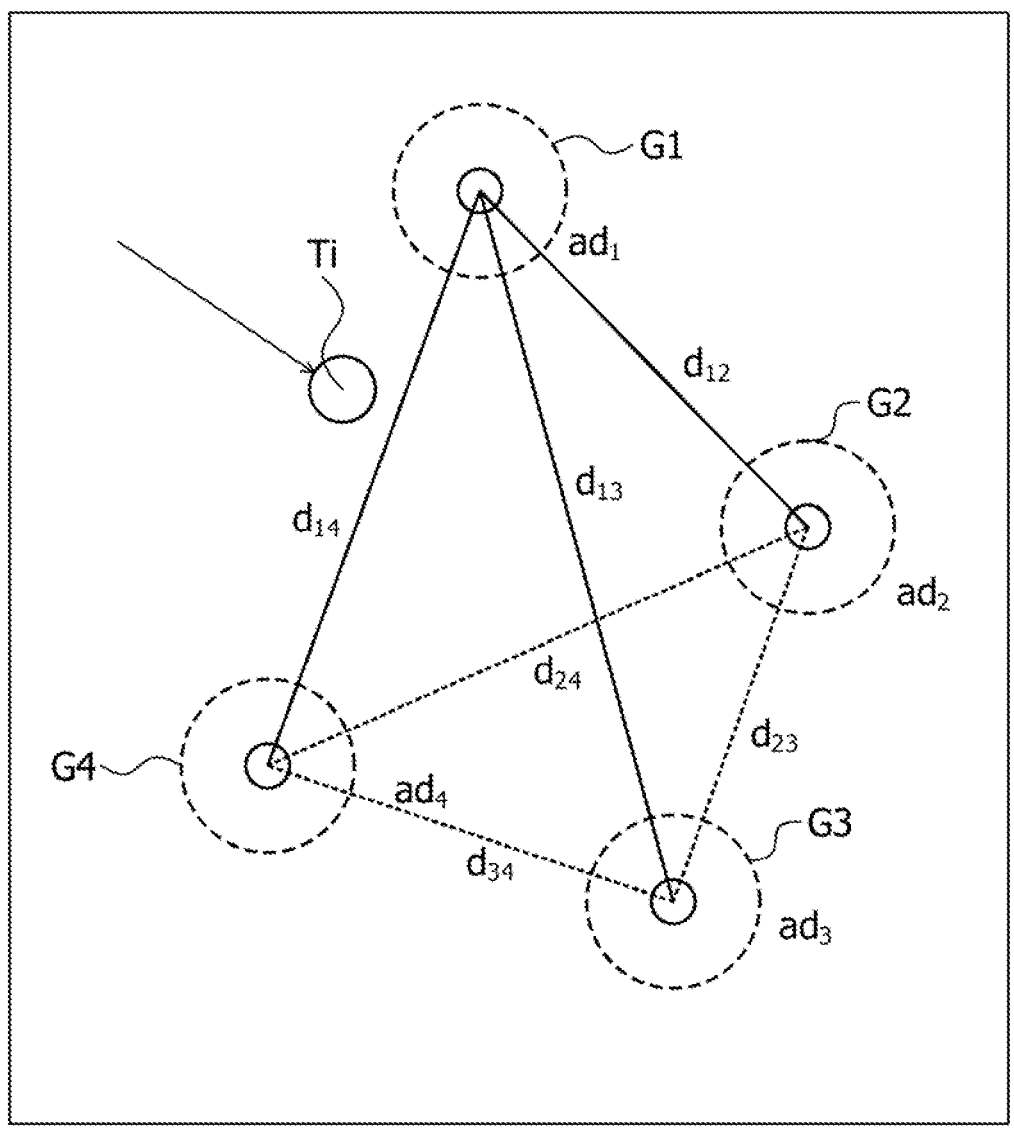
FIG. 17 is an explanatory diagram illustrating an example of calculating a fourth priority.

FIG. 17 is an explanatory diagram illustrating an example of calculating a fourth priority. FIG. 17 illustrates target geofences G1 to G4. First, the second calculation unit 1005 calculates the inter-point average distance adj using the following expression (8). The inter-point average distance adj is an average value of distances between the target geofence Gj and other target geofences Gk. Note that N is the number of other target geofences G. $d_{jp}$ represents the distance between the target geofence Gj and the p-th another target geofence G.

[Math. 1]

$$adj = \frac{\sum_{p=1}^{N} d_{jp}}{N} \qquad (8)$$

Taking the target geofence Gi as an example, the inter-point average distance ad1 of the target geofence G1 is "ad1=$(d_{12}+d_{13}+d_{14})$/3".

Next, the second calculation unit 1005 calculates priorities P1 to P4 (fourth priorities) of the target geofences G1 to G4 using the following expression (9).

$$Pj = adj \qquad (9)$$

Thereby, a higher priority Pj (fourth priority) can be calculated for the target geofence Gj having a larger inter-point average distance adj and a lower degree of density of the target geofences G in the vicinity, of the target geofences G1 to G4.

Note that the second calculation unit 1005 may calculate reciprocals of inter-point average distances ad1 to ad4 as the priorities P1 to P4 of the target geofences Gi to G4. Thereby, a higher priority Pj (fourth priority) can be calculated for the target geofence Gj having a smaller inter-point average distance adj and a higher degree of density of the target geofences G in the vicinity, of the target geofences G1 to G4.

(Examples of Controlling Size of Target Geofence Gj)

Next, examples of controlling the size (radius rj) of the target geofence Gj will be described below with reference to FIGS. 18 to 20.

Figure 18:
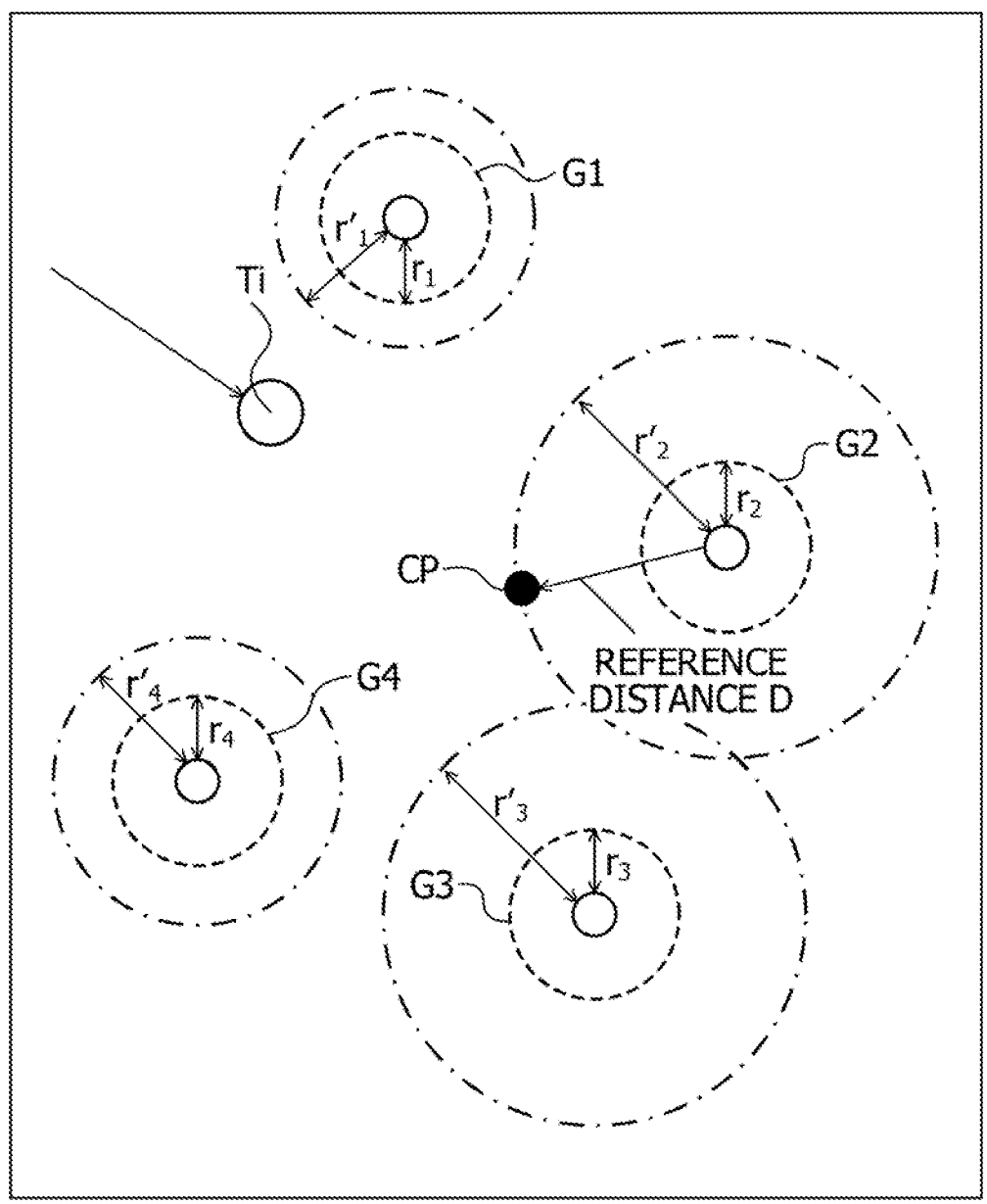
FIG. 18 is an explanatory diagram (part 1) Illustrating an example of controlling the size of a target geofence Gj.

FIG. 18 is an explanatory diagram (part 1) Illustrating an example of controlling the size of a target geofence Gj. FIG. 18 illustrates target geofences G1 to G4. First, the geofence control unit 1006 refers to the geofence situation table 260, for example, and specifies the target geofence G having the highest priority P among the target geofences G1 to G4. Here, a case in which the target geofence G2 is specified as the target geofence G having the highest priority P is assumed.

In this case, the geofence control unit 1006 calculates a distance between the target geofence G2 and the center point CP of the search range SR on the basis of the specified position (latitude and longitude) of the target geofence G2 and the coordinates (X, Y) of the center point CP of the search range SR. Then, the geofence control unit 1006 sets the calculated distance as the reference distance D.

Next, the geofence control unit 1006 compares the calculated reference distance D with radii r1 to r4 of the target geofences G1 to G4. Here, in a case where the radius rj of the target geofence Gj is larger than the reference distance D, the geofence control unit 1006 does not control the radius rj of the target geofence Gj.

On the other hand, in a case where the radius rj of the target geofence Gj is equal to or smaller than the reference distance D, the geofence control unit 1006 controls the radius rj of the target geofence Gj using, for example, the following expression (10). Note that r'j is a controlled radius (control radius) of the target geofence Gj. $P_{max}$ is the highest priority P of the priorities P of the target geofences G.

$$r'j = D*(Pj/P_{max}) \qquad (10)$$

Thereby, the control radii r'1 to r'4 of the target geofences G1 to G4 can be controlled not to exceed the reference distance D and to become larger as the priorities P1 to P4 are higher. Next, another method of calculating the reference distance D will be described with reference to FIG. 19.

Figure 19:
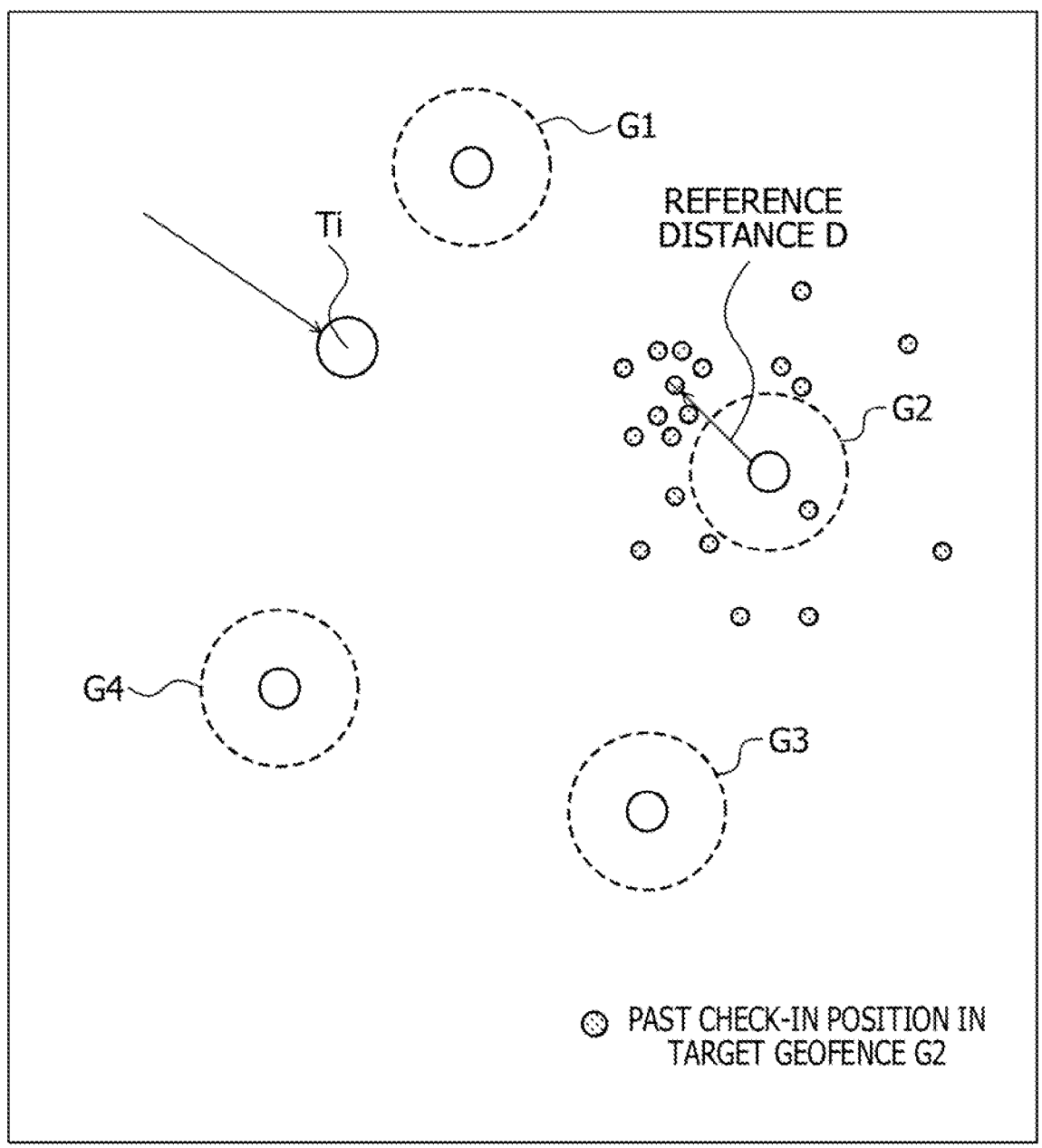
FIG. 19 is an explanatory diagram (part 2) Illustrating an example of controlling the size of the target geofence Gj.

FIG. 19 is an explanatory diagram (part 2) illustrating an example of controlling the size of the target geofence Gj. FIG. 19 illustrates target geofences G1 to G4. First, the geofence control unit 1006 refers to the geofence situation table 260, for example, and specifies the target geofence G having the highest priority P among the target geofences G1 to G4. Here, a case in which the target geofence G2 is specified as the target geofence G having the highest priority P is assumed.

Next, the geofence control unit 1006 inquires of the server 201 the position of the user of when the entry to the specified target geofence G2 has been detected. In this case, for example, the server 201 refers to the check-in/out list 240 illustrated in FIG. 7, and specifies the position of the user of when the entry to the target geofence G2 has been detected.

Specifically, for example, the server 201 refers to the check-In/out list 240, and specifies the latitude and longitude of the check-In/out information in which "G2" is set to the geofence ID and "in" Is set to the check-In/out. At this time, the server 201 may specify the latitude and longitude of the most recent predetermined (for example, 10) pieces of check-in/out information.

Then, the server 201 transmits the position of the user of when the entry to the specified target geofence G2 has been detected to the terminal device Ti. Thereby, the geofence control unit 1006 can specify the past check-in position in the target geofence G2.

In the following description, the position of the user of when the entry to the target geofence Gj has been detected may be described as "check-in positions c1 to cM" (M: a natural number of 2 or larger). Furthermore, an arbitrary check-in position in the check-in positions c1 to cM may be described as "check-in position cp" (p=1, 2, . . . , M).

Next, the geofence control unit 1006 calculates relative average distances L1 to LM for the check-in positions c1 to cM of the specified target geofence G2, using the following expression (11). Note that a relative average distance Lp indicates an average value of distances between the check-in position cp of the target geofence Gj and other check-In positions cq. $I_{pq}$ is the distance between the check-in position cp and another check-in position cq.

[Math. 2]

$$Lp = \frac{\sum_{q=1}^{M} l_{pq}}{M} \qquad (11)$$

Then, the geofence control unit 1006 specifies the check-in position cp of the shortest relative average distance $L_{min}$ among the calculated relative average distances L1 to LM. Next, the geofence control unit 1006 calculates the distance between the check-in position cp of the specified relative average distance $L_{min}$ and the target geofence G2 having the priority $P_{max}$. Then, the geofence control unit 1006 sets the calculated distance as the reference distance D.

Thereby, the position where the possibility to checking in to (entering to) the target geofence G2 is high, in other words, the distance appropriate for checking in to the target geofence G2 can be set as the reference distance D. Next, a case of controlling the size of the target geofence Gj so that the target geofences do not overlap will be described with reference to FIG. 20.

Figure 20:
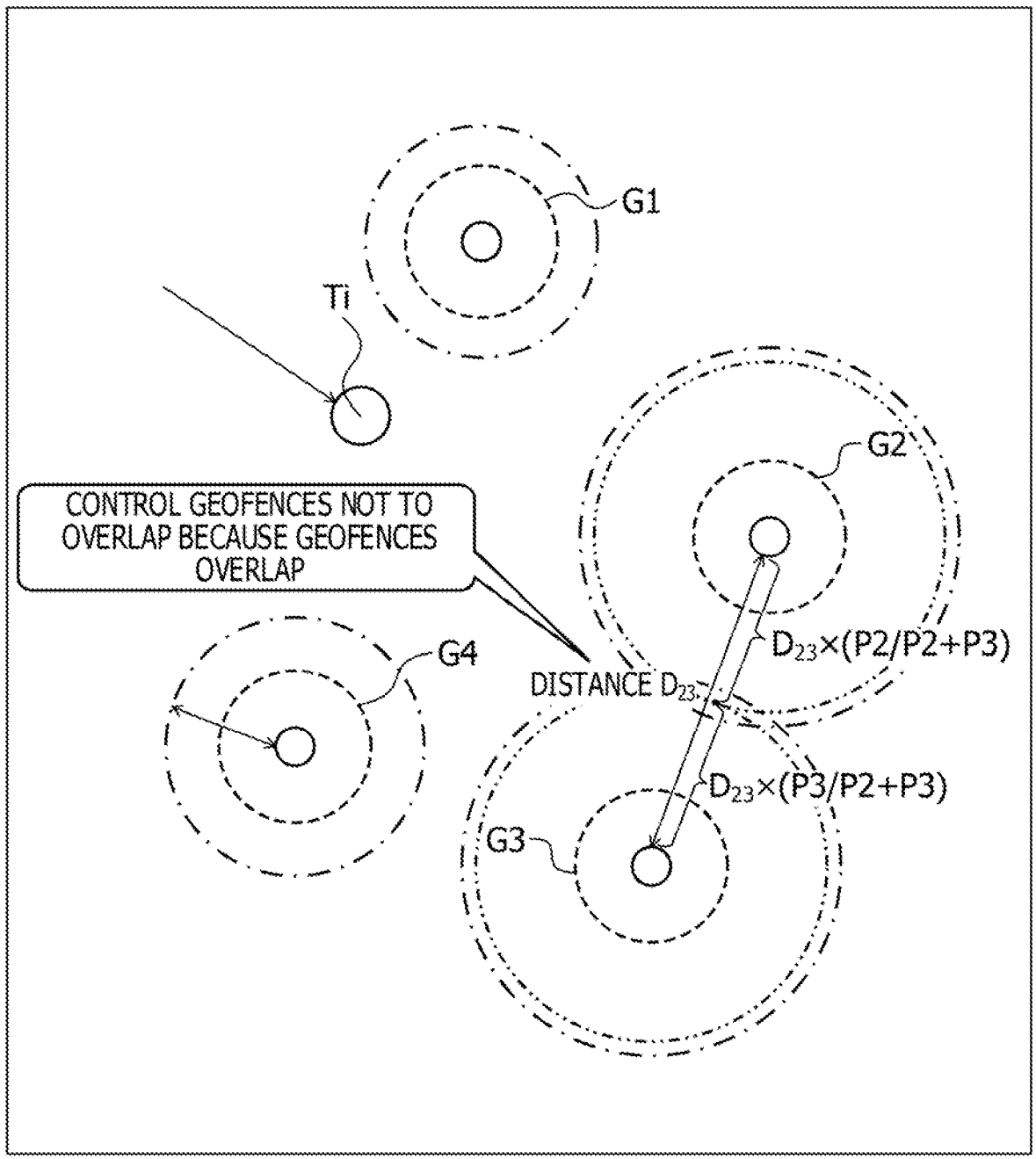
FIG. 20 is an explanatory diagram (part 3) illustrating an example of controlling the size of the target geofence Gj.

FIG. 20 is an explanatory diagram (part 3) illustrating an example of controlling the size of the target geofence Gj. FIG. 20 illustrates target geofences G1 to G4. For example, as described in FIG. 18, when controlling the size of each of the target geofences G1 to G4, the target geofence G2 (dot-dash-line circle) and the target geofence G3 (dot-dash-line circle) overlap.

In this case, the geofence control unit 1006 reduces the sizes of the target geofences G2 and G3 using, for example, a ratio of the priorities P2 and P3 of the target geofences G2 and G3. Specifically, for example, the geofence control unit 1006 controls the radii r2 and r3 of the target geofences G2 and G3 using the following expression (12).

Note that r'j is a controlled radius (control radius) of the target geofence Gj. Pj is the priority of the target geofence Gj. Pk is the priority of another target geofence Gk that overlaps with the target geofence Gj. $D_{jk}$ is the distance between the target geofence Gj and another target geofence Gk.

$$r'j = D_{jk} * (Pj/Pj + Pk) \qquad (12)$$

Thereby, the sizes of the target geofences G2 and G3 can be reduced so that the target geofence G2 and the target geofence G3 do not overlap (two-dot-dash-line circles in FIG. 20).

(Control Processing Procedure of Terminal Device Ti)

Figure 21:
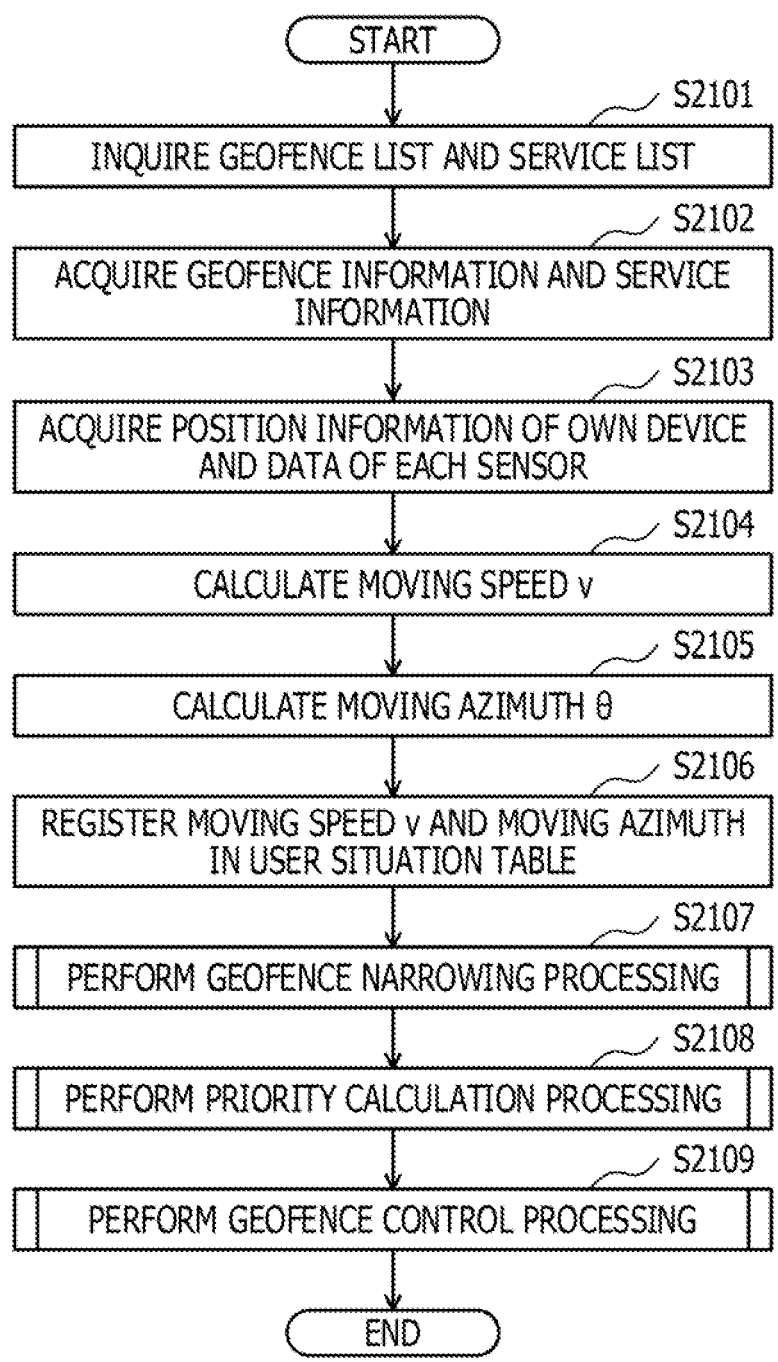
FIG. 21 is a flowchart illustrating an example of a control processing procedure of the terminal device Ti.

Next, a control processing procedure of the terminal device Ti will be described with reference to FIGS. 21 to 24. For example, the control processing of the terminal device Ti may be periodically executed at predetermined time intervals or may be executed at predetermined timing. The predetermined timing may be, for example, timing at which all of services are not provided, in other words, timing at which the terminal device Ti does not belong to any geofence G. Note that the geofence G whose size has been once controlled may be reset every time the processing procedure illustrated in FIG. 21 is newly executed. For example, the radius of the expanded geofence G is returned to the initial setting value at the timing when the processing procedure illustrated in FIG. 21 is newly executed.

FIG. 21 is a flowchart illustrating an example of a control processing procedure of the terminal device Ti. In the flowchart in FIG. 21, first, the terminal device Ti Inquires of the server 201 the geofence list 220 and the service list 230 (step S2101). Then, the terminal device Ti receives the geofence information and the service information from the server 201, thereby acquiring the geofence information and the service information (step S2102).

The acquired geofence information is stored in the geofence list (terminal side) (not illustrated). The acquired service information is stored in the service list (terminal side) (not illustrated).

Next, the terminal device Ti acquires the position information of the terminal device Ti and the data of the sensors 308 and 309 (step S2103). Then, the terminal device Ti calculates the moving speed v of the terminal device Ti on the basis of the acquired position information of the terminal device Ti and the acquired data of the acceleration sensor 308 (step S2104).

Next, the terminal device Ti calculates the moving azimuth θ of the terminal device Ti on the basis of the acquired position information of the terminal device Ti and the acquired data of the geomagnetic sensor 309 (step S2105). Then, the terminal device 11 registers the acquired position information of the terminal device Ti, the calculated moving speed v of the terminal device Ti, and the calculated moving azimuth θ of the terminal device Ti in the user situation table 250 (step S2106).

Next, the terminal device Ti executes geofence narrowing processing (step S2107). The geofence narrowing processing is processing of extracting the target geofence G. A specific processing procedure of the geofence narrowing processing will be described below with reference to FIG. 22.

Next, the terminal device Ti executes priority calculation processing (step S2108). The priority calculation processing is processing of calculating the priority P of the target geofence G. A specific processing procedure of the priority calculation processing will be described below with reference to FIG. 23.

Then, the terminal device Ti executes geofence control processing (step S2109) and terminates the series of processing of the present flowchart. The geofence control processing is processing of controlling the size of the target geofence G. A specific processing procedure of the geofence control processing will be described below with reference to FIG. 24.

Thereby, the target geofences G are narrowed according to the situation of the user of the terminal device Ti and the situation of the geofence G, and the size of the target geofence G can be controlled.

Next, a specific processing procedure of the geofence narrowing processing in step S2107 illustrated in FIG. 21 will be described with reference to FIG. 22.

Figure 22:
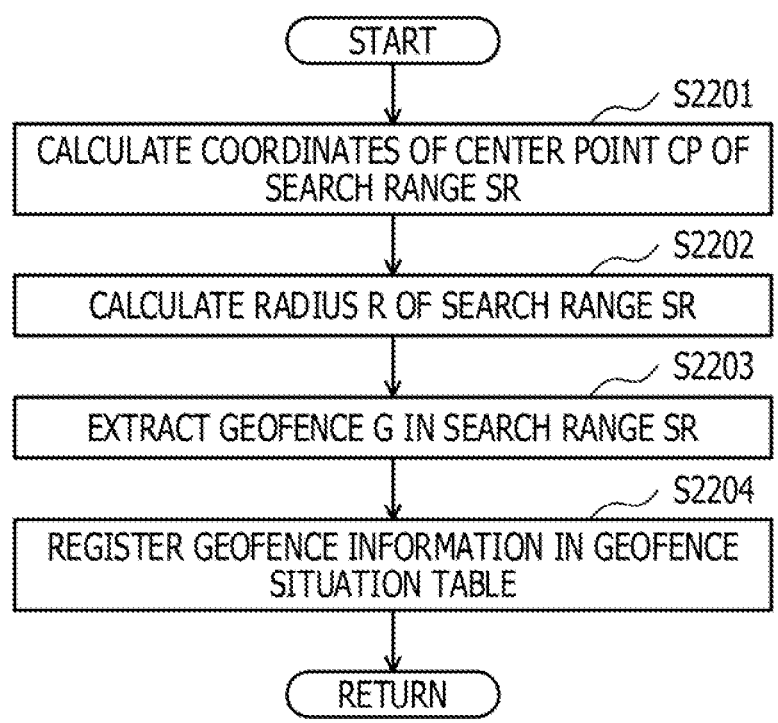
FIG. 22 is a flowchart illustrating an example of a specific processing procedure of geofence narrowing processing.

FIG. 22 is a flowchart illustrating an example of a specific processing procedure of geofence narrowing processing. In the flowchart in FIG. 22, first, the terminal device Ti calculates the coordinates of the center point CP of the search range SR on the basis of the moving speed v of the terminal device Ti, the moving azimuth θ of the terminal device Ti, and the acquisition interval t of the position information of the terminal device Ti (step S2201).

Next, the terminal device Ti calculates the radius R of the search range SR on the basis of the moving speed v of the terminal device Ti and the positioning error e of the position information of the terminal device Ti (step S2202). Then, the terminal device Ti refers to the geofence list (terminal side) (not illustrated) and extracts the target geofence G within the search range SR (step S2203).

Then, the terminal device Ti registers the geofence information of the extracted target geofence G in the geofence situation table 260 (step S2204), and returns to the step calling the geofence narrowing processing. Thereby, the target geofence G can be narrowed down according to the situation (the moving speed v, moving azimuth θ, and positioning error e) of the user of the terminal device Ti. Specifically, for example, the geofences G around the point to which the terminal device Ti is estimated to move can be narrowed down as the target geofence G.

Next, a specific processing procedure of the priority calculation processing in step S2108 illustrated in FIG. 21 will be described with reference to FIG. 23.

Figure 23:
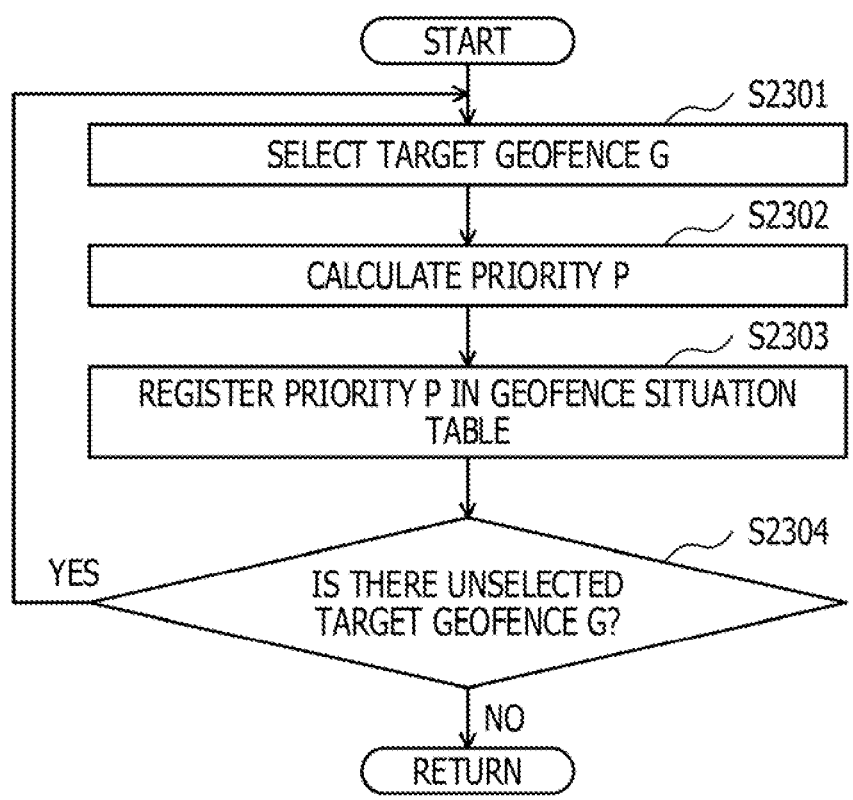
FIG. 23 is a flowchart illustrating an example of a specific processing procedure of priority calculation processing.

FIG. 23 is a flowchart illustrating an example of a specific processing procedure of priority calculation processing. In the flowchart in FIG. 23, first, the terminal device Ti selects an unselected target geofence G that has not been selected from the target geofence set (step S2301). Then, the terminal device Ti calculates the priority P of the selected target geofence G (step S2302).

Here, the priority P of the target geofence G may be any one of the above-described first priority, second priority, third priority, and fourth priority. Furthermore, the priority P of the target geofence G may be calculated on the basis of at least two or more priorities of the first priority, second priority, third priority, and fourth priority.

Next, the terminal device Ti registers the calculated priority P of the target geofence G in the geofence situation table 260 (step S2303). Then, the terminal device Ti determines whether there is an unselected target geofence G that has not been selected from the target geofence set (step S2304).

Here, in a case where there is an unselected target geofence G (step S2304: Yes), the terminal device Ti returns to step S2301. On the other hand, in a case where there is no unselected target geofence G (step S2304: No), the terminal device Ti returns to the step calling the priority calculation processing.

Thereby, the priority P of the target geofence G can be calculated according to the situation (the position and moving azimuth θ) of the user of the terminal device Ti and the situation (the position, the degree of popularity, the degree of congestion, and the degree of density) of the target geofence G.

Next, a specific processing procedure of the geofence control processing in step S2109 illustrated in FIG. 21 will be described with reference to FIG. 24.

Figure 24:
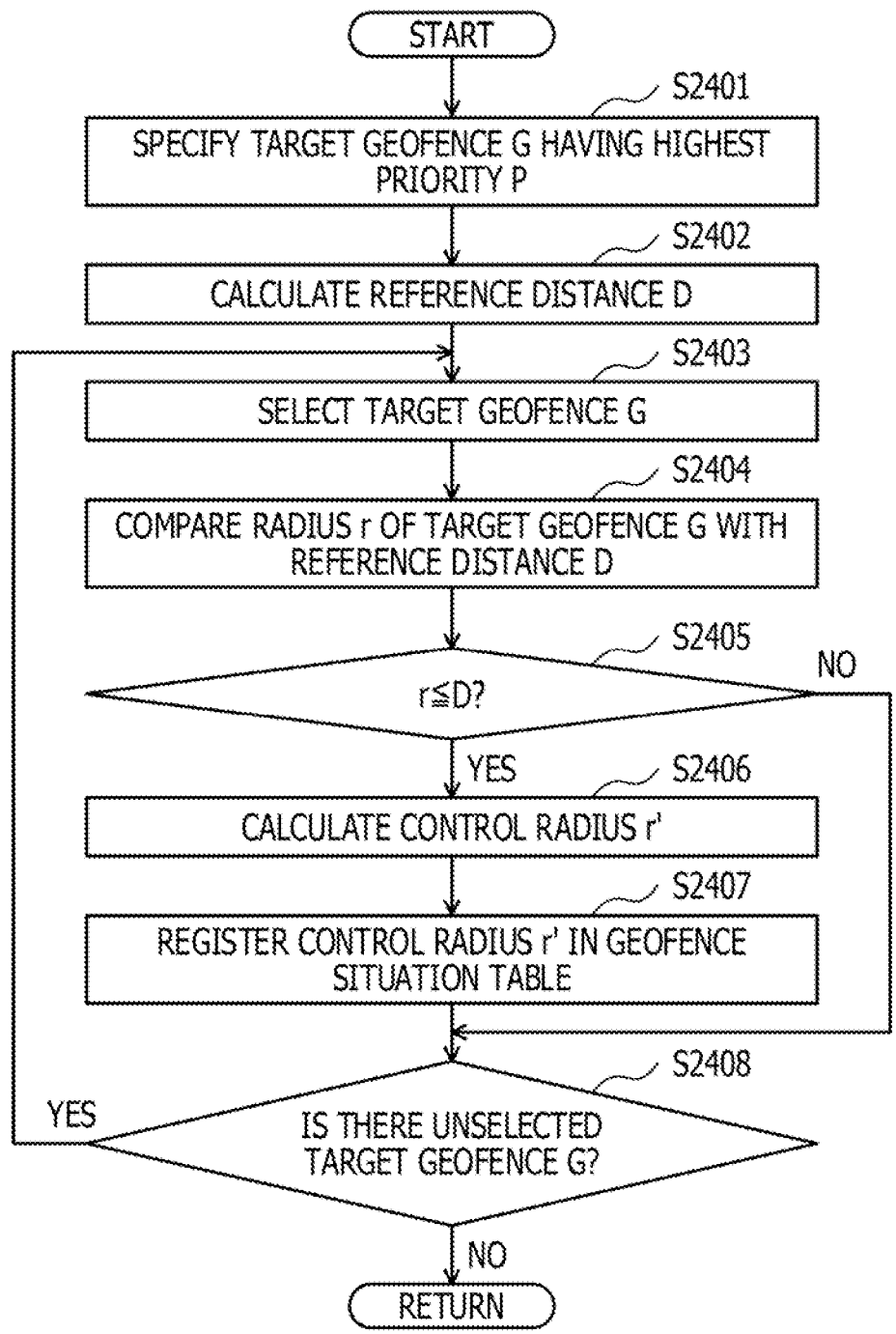
FIG. 24 is a flowchart illustrating an example of a specific processing procedure of geofence control processing.

FIG. 24 is a flowchart illustrating an example of a specific processing procedure of geofence control processing. In the flowchart in FIG. 24, first, the terminal device Ti refers to the geofence situation table 260 and specifies the target geofence G having the highest priority P (step S2401).

Next, the terminal device Ti calculates the reference distance D on the basis of the position of the specified target geofence G and the coordinates of the center point CP of the search range SR (step S2402). Then, the terminal device Ti selects an unselected target geofence G that has not been selected from the target geofence set (step S2403).

Next, the terminal device Ti compares the radius r of the selected target geofence G with the calculated reference distance D (step S2404). Then, the terminal device Ti determines whether the radius r of the target geofence Gj Is equal to or smaller than the reference distance D (step S2405).

Here, in a case where the radius r of the target geofence G is larger than the reference distance D (step S2405: No), the terminal device Ti proceeds to step S2408. In this case, the radius r of the target geofence G is registered in the geofence situation table 260 as the control radius r' of the target geofence G.

On the other hand, in a case where the radius r of the target geofence G is equal to or smaller than the reference distance D (step S2405: Yes), the terminal device Ti calculates the control radius r' of the target geofence G using the above expression (10) (step S2406). Then, the terminal device Ti registers the calculated control radius r' of the target geofence G in the geofence situation table 260 (step S2407).

Next, the terminal device Ti determines whether there is an unselected target geofence G that has not been selected from the target geofence set (step S2408). Here, in the case where there is an unselected target geofence G (step S2408: Yes), the terminal device Ti returns to step S2403.

On the other hand, in the case where there is no unselected target geofence G (step S2408: No), the terminal device Ti returns to the step calling the geofence control processing. Thereby, the size of the target geofence G can be controlled according to the situation (the position and moving azimuth θ) of the user of the terminal device Ti and the situation (the position, the degree of popularity, the degree of congestion, and the degree of density) of the target geofence G.

(Information Providing Processing Procedure of Terminal Device Ti)

Next, the information providing processing procedure of the terminal device Ti will be described with reference to FIG. 25. The information providing processing of the terminal device Ti is periodically executed, for example, at every acquisition interval t of the position information of the terminal device Ti.

FIG. 25 is a flowchart illustrating an example of an information providing processing procedure of the terminal device Ti. In the flowchart in FIG. 25, first, the terminal device Ti acquires the position information of the terminal device Ti (step S2501). Next, the terminal device Ti refers to the geofence situation table 260 and selects an unselected target geofence G that has not been selected from the target geofence set (step S2502).

Next, the terminal device Ti determines whether the terminal device Ti is inside the target geofence G on the basis of the position information of the terminal device Ti, and the latitude, longitude, and control radius of the selected target geofence G in the geofence situation table 260 (step S2503). Here, in a case where the terminal device Ti is inside the target geofence G (step S2503: Yes), the terminal device Ti determines whether a service flag corresponding to the target geofence G is "O" (step S2504).

The service flag is information Indicating whether provision of a service corresponding to the target geofence G has been started. The provision of a service corresponds to, for example, obtaining, in the terminal device 11, information (for example, a coupon image, advertisement information, a message, or the like) regarding the service corresponding to the target geofence G and outputting the acquired information to the display 303 or the like. Here, the service flag "0" Indicates that the provision of the service corresponding to the target geofence G has not been started. The service flag "1" Indicates that the provision of the service corresponding to the target geofence G has been started. The service flag may be stored in the geofence situation table 260 in association with the target geofence G, for example.

Here, in the case where service flag is "1" (step S2504: No), the terminal device Ti proceeds to step S2508. On the other hand, in the case where the service flag is "0" (step S2504: Yes), the terminal device Ti changes the service flag corresponding to the target geofence G to "1" (step S2505), and proceeds to step S2508.

Furthermore, in step S2503, in a case where the terminal device Ti is outside the target geofence G (step S2503: No), the terminal device Ti determines whether the service flag corresponding to the target geofence G is "1" (step S2506).

Here, in the case where service flag is "0" (step S2506: No), the terminal device Ti proceeds to step S2508. On the other hand, in the case where the service flag is "1" (step S2506: Yes), the terminal device Ti changes the service flag corresponding to the target geofence G to "0" (step S2507).

Next, the terminal device Ti determines whether there is an unselected target geofence G that has not been selected from the target geofence set (step S2508). Here, in the case where there is an unselected target geofence G (step S2508: Yes), the terminal device Ti returns to step S2502.

On the other hand, in the case where there is no unselected target geofence G (step S2508: No), the terminal device Ti terminates the series of processing by the present flowchart. Thereby, the information (for example, a coupon image, advertisement information, a message, or the like) regarding the service corresponding to the target geofence G can be notified to the user of the terminal device Ti.

Note that, in step S2504, in the case where the service flag is "0" (step S2504: Yes), the terminal device Ti notifies the server 201 that the entry of the terminal device Ti to the target geofence G has been detected, for example. Furthermore, in step S2506, in the case where the service flag is "1" (step S2506: Yes), the terminal device Ti notifies the server 201 that the leaving of the terminal device Ti from the target geofence G has been detected, for example.

As described above according to the terminal device Ti of the embodiment, the moving speed v of the terminal device Ti can be calculated on the basis of the position information of the terminal device Ti (own device) and the data of the acceleration sensor 308. Furthermore, according to the terminal device Ti, the moving azimuth θ of the terminal device Ti can be calculated on the basis of the position information of the terminal device Ti and the data of the geomagnetic sensor 309. Thereby, the situation (the position, moving speed v, and moving azimuth θ) of the user of the terminal device Ti can be specified.

Furthermore, according to the terminal device Ti, the position of the terminal device Ti at any point of time on or after the point of time when the position information of the terminal device Ti has been acquired can be calculated as the center point CP of the search range SR on the basis of the moving speed v and the moving azimuth θ of the terminal device Ti and the acquisition interval t of the position information of the terminal device Ti. Furthermore, according to the terminal device Ti, the radius R of the search range SR can be calculated on the basis of the moving speed v of the terminal device Ti and the positioning error e of the position information of the terminal device Ti. Then, according to the terminal device Ti, the search range SR of the calculated radius R centered on the calculated position (center point CP) can be set.

Thereby, the search range SR for searching for the target geofence G can be set according to the situation (the position, the moving speed v, and moving azimuth θ) of the user of the terminal device Ti. Specifically, the search range SR centered on the position that the user of the terminal device Ti is estimated to reach in the future can be set.

Furthermore, according to the terminal device Ti, the target geofence G in the set search range SR can be extracted and the size of the target geofence G can be controlled. Thereby, the geofence R around the point to which the user of the terminal device Ti Is likely to move in the future can be narrowed as the target geofence G, and the size of the target geofence R can be controlled so as to avoid non-detection of the entry and leaving of the user of the terminal device Ti.

Furthermore, according to the terminal device Ti, for each target geofence Gj, the angle θj of the azimuth from the terminal device Ti to the target geofence Gj with respect to the moving azimuth θ of the terminal device Ti can be calculated, and the first priority according to the calculated angle θj can be calculated as the priority Pj of the target geofence Gj. Thereby, for example, a higher priority Pj (first priority) can be calculated for the target geofence Gj that can be said to have a larger angle (relative angle) of the azimuth of the target geofence G with respect to the moving azimuth θ of the terminal device Ti and have a lower possibility that the user of the terminal device Ti is headed to.

Furthermore, according to the terminal device Ti, for each target geofence Gj, the distance dj from the terminal device Ti to the target geofence Gj can be calculated, and the second priority according to the calculated distance dj can be calculated as the priority Pj of the target geofence Gj. Thereby, for example, a higher priority Pj (second priority) can be calculated for the target geofence Gj that can be said to be located at a distance farther from the user of the terminal device Ti and have a lower possibility that the user of the terminal device Ti is headed to.

Furthermore, according to the terminal device Ti, for each target geofence Gj, the third priority according to the number of users (past check-in count pcc (j)) whose entry to the target geofence Gj has been detected within the predetermined period T can be calculated as the priority Pj of the target geofence Gj. Thereby, for example, a higher priority Pj (third priority) can be calculated for the target geofence Gj having a smaller past check-in count and a lower degree of popularity, for example.

Furthermore, according to the terminal device Ti, for each target geofence Gj, the third priority according to the number of users (current check-in count ccc (j)) present in the target geofence Gj can be calculated as the priority Pj of the target geofence Gj. Thereby, for example, a higher priority Pj (third priority) can be calculated for the target geofence Gj having a smaller current check-in count and a lower degree of congestion, for example.

Furthermore, according to the terminal device Ti, for each target geofence Gj, the inter-point average distance adj indicating the average value of the distances between the target geofence Gj and other target geofences Gk can be calculated, and the fourth priority according to the calculated inter-point average distance adj can be calculated as the priority Pj of the target geofence Gj. Thereby, for example, a higher priority Pj (fourth priority) can be calculated for the target geofence Gj having a larger inter-point average distance adj and a lower degree of density of the target geofences G in the vicinity.

Furthermore, according to the terminal device Ti, the size (control radius r') of the target geofence Gj can be controlled on the basis of the calculated priority Pj of the target geofence Gj. Thereby, the size (control radius r') of the target geofence G can be controlled to be larger as the priority P is higher. In other words, the size of the target geofence can be controlled according to the situation of the user of the terminal device Ti and the situation of the target geofence G.

Furthermore, according to the terminal device Ti, the distance between the target geofence G having the highest priority P, of the extracted target geofences G, and the center point CP of the search range SR can be calculated. Then, according to the terminal device Ti, the size (control radius r') of the target geofence Gj can be controlled on the basis of the priority Pj of the target geofence Gj according to the result of comparison between the radius r of each target geofence G and the reference distance D, using the calculated distance as the reference distance D. Thereby, the control radius r' of the target geofence G can be controlled not to exceed the reference distance D corresponding to the distance from the target geofence G having the highest priority P to the center point CP of the search range SR and to be larger as the priority P is higher.

Furthermore, according to the terminal device Ti, the check-In position cp having the shortest relative average distance Lp Indicating the average value of the distance $I_{pq}$ from other check-in positions cq, of the check-in positions c1 to cM of the target geofence G having the highest priority P, can be specified. Then, according to the terminal device Ti, the distance between the specified check-in position cp and the target geofence G having the highest priority P can be calculated as the reference distance D. Thereby, the size (control radius r') of each target geofence Gj can be controlled using the distance appropriate for checking in to the target geofence G having the highest priority P as the reference distance D.

Furthermore, according to the terminal device Ti, the size of the target geofence Gj can be controlled on the basis of the priority Pj of the target geofence Gj so as not to allow the target geofence Gj and another target geofence Gk to overlap. Thereby, the target geofence G can be reduced such that the target geofences do not overlap. Therefore, occurrence of a portion where a plurality of target geofences G overlaps and an excessive notification to the user of the terminal device Ti can be prevented.

Furthermore, according to the terminal device Ti, the entry to the target geofence G or the leaving from the target geofence G of the user of the terminal device Ti can be detected on the basis of the controlled size (control radius r') of the target geofence G. Then, according to the terminal device Ti, the information regarding the service corresponding to the target geofence G can be output in response to the detection of the entry or the leaving.

Thereby, the entry to the target geofence G or the leaving from the target geofence G having the size controlled according to the situation of the user of the terminal device Ti or the situation of the target geofence G can be detected. As a result, the information (for example, a coupon image, advertisement information, a message, or the like) of a shop, a facility, or the like can be effectively notified to the user of the terminal device Ti. For example, the user of the terminal device Ti can be guided to a place having a low possibility that the user is headed to from the current situation of the user, and the service can be provided to the user. Furthermore, the user can be guided to a place having a low degree of popularity and a low degree of congestion, and the service can be provided to the user. Furthermore, the user of the terminal device Ti can be guided to a place having a low geofence density, and the service can be provided to the user.

For these reasons, according to the information providing system 200 of the embodiment, the position information service capable of appropriately notifying the information of shops, facilities, and the like around the user can be provided while preventing an excessive notification to the user.

(Modification)

The terminal device Ti may set the search range SR having the radius R calculated by the above expression (3) centering on the current position of the user. Moreover, the terminal device Ti may set a search range SR having a predetermined radius R1 centering on the current position of the user or a position to which the user will move in the future. The terminal device Ti excludes the geofence related to a place significantly distant from the user from the control target, thereby preventing a notification related to the place significantly distant from the user from being unnecessarily provided to the user.

Note that the information providing method described in the present embodiment can be implemented by executing a prepared program on a computer such as a personal computer or a workstation. The present information provision program is recorded on a computer-readable recording medium such as a hard disk, a flexible disk, a compact disc (CD)-ROM, a magneto-optical disk (MO), a digital versatile disc (DVD), or a universal serial bus (USB) memory, and is executed by being read from the recording medium by the computer. Furthermore, the present information provision program may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus, comprising:
a memory configured to store, for each of a plurality of areas corresponding to a respective facility, area information indicating a position and size of a geographical boundary line associated with that area; and
a processor coupled to the memory, the processor being configured to:
acquire data regarding a position of a moving body;
set a search range on the basis of the acquired data;
extract, from among the plurality of areas stored in the memory, a target area included at least in part in the search range;
adjust, in response to the extracting of the target area, the size of the extracted target area;
determine, by using the adjusted size of the extracted target area, whether the moving body is within the geographical boundary line of the extracted target area; and
in response to the determining that the moving body is within the geographical boundary line of the extracted target area, perform processing associated with the extracted target area.

2. The information processing apparatus according to claim 1, wherein the processor is configured to
set the predetermined range on the basis of the position of the moving body at any point of time on or after a current point of time of the moving body, the position being predicted on the basis of the data.

3. The information processing apparatus according to claim 1, wherein the processor is configured to
control the size of the target area to be larger than the sizes of the plurality of areas stored in the storage unit.

4. The information processing apparatus according to claim 1, wherein the processor is configured to:
calculate a moving speed and a moving direction of the moving body on the basis of position information of the moving body and data detected by a predetermined sensor corresponding to the moving body, of the data detected by the sensor,
calculate the position of the moving body at any point of time on or after a point of time when the position information of the moving body has been acquired, on the basis of the moving speed and the moving direction of the moving body and an acquisition interval of the position information of the moving body, and
set the predetermined range centered on the calculated position of the moving body on the basis of the moving speed of the moving body and a positioning error of the position information of the moving body.

5. The information processing apparatus according to claim 1, wherein the processor is configured to:
calculate, for each extracted target area, a priority according to an angle of a direction from the moving body to the target area with respect to a moving direction of the moving body on the basis of position information of the moving body and data detected by a predetermined sensor corresponding to the moving body, of the data detected by the sensor, and a position of the target area, and
control the size of the target area on the basis of the calculated priority of the target area.

6. The information processing apparatus according to claim 1, wherein the processor is configured to:
calculate, for each extracted target area, a priority according to a distance from the moving body to the target area on the basis of position information of the moving body and a position of the target area, and
control the size of the target area on the basis of the calculated priority of the target area.

7. The information processing apparatus according to claim 1, wherein the processor is configured to:
store the number of moving bodies whose entry to the plurality of areas has been detected within a predetermined period,
calculate, for each extracted target area, a priority according to the number of moving bodies whose entry to the target area has been detected within the predetermined period, and
control the size of the target area on the basis of the calculated priority of the target area.

8. The information processing apparatus according to claim 1, wherein the processor is configured to:
store the number of moving bodies present in the plurality of areas,
calculate, for each extracted target area, a priority according to the number of moving bodies present in the target area, and
control the size of the target area on the basis of the calculated priority of the target area.

9. The information processing apparatus according to claim 1, wherein the processor is configured to:
calculate, for each extracted target area, a priority according to an average value of distances between the target area and extracted other target areas on the basis of a position of the target area and positions of the other target areas, and
control the size of the target area on the basis of the calculated priority of the target area.

10. The information processing apparatus according to claim 9, wherein the processor is configured to:
calculate a distance between a target area having a highest calculated priority, of extracted target areas, and a center of the predetermined range, and
control the size of the target area on the basis of the priority of the target area according to a result of comparison between the calculated distance and the size of the target area.

11. The information processing apparatus according to claim 9, wherein the processor is configured to:
specify a position having a shortest average value of distances from other positions, of positions of the moving body of when entry to a target area having a highest calculated priority has been detected, of extracted target areas,
calculate a distance between the specified position and a center of the target area having the highest priority, and
control the size of the target area on the basis of the priority of the target area according to a result of comparison between the calculated distance and the size of the target area.

12. The information processing apparatus according to claim 9, wherein the processor is configured to
control the size of the target area on the basis of the priority of the target area so as not to allow the target area and another target area to overlap.

13. The information processing apparatus according to claim 1, wherein the processor is configured to
output information regarding a service corresponding to the target area in response to detection of at least either entry to the target area or leaving from the target area, of the moving body, on the basis of the controlled size of the target area.

14. An information providing method executed by a computer, the method comprising:
referring to a memory configured to store, for each of a plurality of areas corresponding to a respective facility, area information indicating a position and size of a geographical boundary line associated with that area;
acquiring data a position of a moving body;
setting a search range on the basis of the acquired data;
extracting, from among the plurality of areas stored in the memory, a target area included at least in part in the search range;
adjusting, in response to the extracting of the target area, the size of the extracted target area;
determining, by using the adjusted size of the extracted target area, whether the moving body is within the geographical boundary line of the extracted target area; and
in response to the determining that the moving body is within the geographical boundary line of the extracted target area, performing processing associated with the extracted target area.

15. An information providing system, comprising:
an information processing apparatus that includes:
a first memory configured to store, for each of a plurality of areas corresponding to a respective facility, area information indicating a position and size of a geographical boundary line associated with that area, and
a first processor coupled to the first memory; and
a terminal device that includes:
a second memory, and
a second processor coupled to the second memory,
wherein the first processor is configured to
in response to a request from the terminal device, transmit to the terminal device the area information for at least a part of the plurality of areas stored in the first memory,
wherein the second processer is configured to:
transmit the request to the information processing apparatus to obtain the area information from the information processing apparatus;
acquire data detected by a sensor, the acquired data being data regarding a position of a moving body;
set a search range on the basis of the acquired data,
extract, from among the plurality of areas stored in the memory, a target area included at least in part in the search range;
adjust, in response to the extracting of the target area, the size of the extracted target area;

determine, by using the adjusted size of the extracted target area, whether the moving body is within the geographical boundary line of the extracted target area; and in response to the determining that the moving body is within the geographical boundary line of the extracted target area, perform processing associated with the extracted target area.

* * * * *